(12) United States Patent
Hickman et al.

(10) Patent No.: US 8,639,644 B1
(45) Date of Patent: Jan. 28, 2014

(54) SHARED ROBOT KNOWLEDGE BASE FOR USE WITH CLOUD COMPUTING SYSTEM

(75) Inventors: Ryan Hickman, Mountain View, CA (US); James J. Kuffner, Jr., Mountain View, CA (US); James R. Bruce, Sunnyvale, CA (US); Chaitanya Gharpure, Sunnyvale, CA (US); Damon Kohler, Munich (DE); Arshan Poursohi, Berkeley, CA (US); Anthony G. Francis, Jr., San Jose, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/464,699

(22) Filed: May 4, 2012

Related U.S. Application Data

(60) Provisional application No. 61/483,291, filed on May 6, 2011, provisional application No. 61/588,944, filed on Jan. 20, 2012.

(51) Int. Cl.
| | | |
|---|---|---|
| *G06F 15/18* | (2006.01) | |
| *G06F 17/00* | (2006.01) | |
| *G06N 5/00* | (2006.01) | |
| *G06F 19/00* | (2011.01) | |
| *G05B 19/418* | (2006.01) | |

(52) U.S. Cl.
USPC ............... 706/14; 706/12; 706/45; 700/245; 700/248

(58) Field of Classification Search
None
See application file for complete search history.

(56) References Cited

U.S. PATENT DOCUMENTS

| | | | | |
|---|---|---|---|---|
| 7,209,803 | B2 | 4/2007 | Okamoto | |
| 7,269,479 | B2 | 9/2007 | Okamoto | |
| 7,515,990 | B2 | 4/2009 | Sato | |
| 7,693,753 | B1 | 4/2010 | Purdy | |
| 7,693,757 | B2 * | 4/2010 | Zimmerman | 705/28 |
| 8,095,238 | B2 * | 1/2012 | Jones et al. | 700/245 |
| 8,112,176 | B2 * | 2/2012 | Solomon | 700/245 |

(Continued)

FOREIGN PATENT DOCUMENTS

| | | |
|---|---|---|
| JP | 2004326437 A | 11/2004 |
| JP | 2005088140 A | 4/2005 |

OTHER PUBLICATIONS

Waibel, Markus. "RoboEarth: A World Wide Web for Robots." IEEE Spectrum Feb. 5, 2011.*

(Continued)

*Primary Examiner* — Kakali Chaki
*Assistant Examiner* — Daniel Pellett
(74) *Attorney, Agent, or Firm* — McDonnell Boehnen Hulbert & Berghoff LLP

(57) ABSTRACT

The present application discloses shared robot knowledge bases for use with cloud computing systems. In one embodiment, the cloud computing system collects data from a robot about an object the robot has encountered in its environment, and stores the received data in the shared robot knowledge base. In another embodiment, the cloud computing system sends instructions for interacting with an object to a robot, receives feedback from the robot based on its interaction with the object, and updates data in the shared robot knowledge base based on the feedback. In yet another embodiment, the cloud computing system sends instructions to a robot for executing an application based on information stored in the shared robot knowledge base. In the disclosed embodiments, information in the shared robot knowledge bases is updated based on robot experiences so that any particular robot may benefit from prior experiences of other robots.

24 Claims, 6 Drawing Sheets

(56) References Cited

U.S. PATENT DOCUMENTS

| | | | |
|---|---|---|---|
| 8,214,079 B2* | 7/2012 | Lee et al. | 700/245 |
| 2004/0019406 A1 | 1/2004 | Wang et al. | |
| 2004/0045204 A1 | 3/2004 | Miano et al. | |
| 2004/0068351 A1* | 4/2004 | Solomon | 701/24 |
| 2004/0118916 A1 | 6/2004 | He | |
| 2009/0254217 A1* | 10/2009 | Pack et al. | 700/246 |
| 2010/0241260 A1* | 9/2010 | Kilibarda et al. | 700/95 |
| 2011/0071676 A1* | 3/2011 | Sanders et al. | 700/250 |
| 2011/0074923 A1 | 3/2011 | Choi et al. | |
| 2011/0075915 A1 | 3/2011 | Hwang et al. | |
| 2011/0288684 A1* | 11/2011 | Farlow et al. | 700/264 |

OTHER PUBLICATIONS

Narita, M.; Shimamura, M.; , "A report on RSi (robot services initiative) activities," Advanced Robotics and its Social Impacts, 2005. IEEE Workshop on , vol., No., pp. 265-268, Jun. 12-15, 2005.*

Vasiliu, L.; Sakpota, B.; Hong-Gee Kim; , "A semantic Web services driven application on humanoid robots," Software Technologies for Future Embedded and Ubiquitous Systems, 2006 and the 2006 Second International Workshop on Collaborative Computing, Integration, and Assurance. SEUS 2006/WCCIA 2006. The Fourth IEEE Workshop on , vol., No., pp. 6 pp.*

Burgard, W.; Moors, M.; Stachniss, C.; Schneider, F.E.; , "Coordinated multi-robot exploration," Robotics, IEEE Transactions on , vol. 21, No. 3, pp. 376-386, Jun. 2005.*

Arumugam, R.; Enti, V.R.; Liu Bingbing; Wu Xiaojun; Baskaran, K.; Foong Foo Kong; Kumar, A.S.; Kang Dee Meng; Goh Wai Kit; , "DAvinCi: A cloud computing framework for service robots," Robotics and Automation (ICRA), 2010 IEEE International Conference on , vol., No., pp. 3084-3089, May 3-7, 2010.*

Angelis, G.; Van Pelt, C.; Van Den Molengraft, M.J.G. "Open innovation to further develop people-friendly robot technology: The RoboEarth Project." Gerontechnology 2010;9(2):76-77.*

Yinong Chen; Zhihui Du; Garcia-Acosta, M.; , "Robot as a Service in Cloud Computing," Service Oriented System Engineering (SOSE), 2010 Fifth IEEE International Symposium on , vol., No., pp. 151-158, Jun. 4-5, 2010.*

Guizzo, Erico. "Robots With Their Heads in the Clouds." IEEE Spectrum Mar. 2011 p. 16-18.*

12.O. Zweigle, M.J.G. van de Molengraft, R. d'Andrea and K. Häussermann, RoboEarth: connecting robots worldwide, in ICIS '09: Proc. of the 2nd Int. Conf. on Interaction Sciences, 2009, pp. 184-191.*

Zweigle, Oliver; Haussermann, Kai; Käppeler, Uwe-Philipp; Levi Paul: Extended TA Algorithm for adapting a Situation Ontology; Progress in Robotics, FIRA RoboWorld Congress 2009, Incheon, South Korea, p. 364-372.*

Hubel et al., "Learning and adaptation in Dynamic Systems: A Literature Survey", ICT Call 4 RoboEarth Project 2010-248942, http://www.roboearth.org, Apr. 1, 2010.*

Bong Keun Kim; Miyazaki, M.; Ohba, K.; Hirai, S.; Tanie, K., "Web Services Based Robot Control Platform for Ubiquitous Functions," Robotics and Automation, 2005. ICRA 2005. Proceedings of the 2005 IEEE International Conference on , vol., No., pp. 691,696, Apr. 18-22, 2005.*

Bong Keun Kim; Tomokuni, N.; Ohara, K.; Tanikawa, T.; Ohba, K.; Hirai, S., "Ubiquitous Localization and Mapping for Robots with Ambient Intelligence," Intelligent Robots and Systems, 2006 IEEE/RSJ International Conference on , vol., No., pp. 4809,4814, Oct. 9-15, 2006.*

Luigi Atzori, Antonio Iera, Giacomo Morabito, The Internet of Things: A survey, Computer Networks, vol. 54, Issue 15, Oct. 28, 2010, pp. 2787-2805.*

Hans-W. Gellersen, Michael Beigl, Holger Krull. "The MediaCup: Awareness Technology Embedded in an Everyday Object" Handheld and Ubiquitous Computing Lecture Notes in Computer Science, vol. 1707, 1999, pp. 308-310.*

Luis Roalter, Matthias Kranz, Andreas Moller. "A Middleware for Intelligent Environments and the Internet of Things" Ubiquitous Intelligence and Computing Lecture Notes in Computer Science, vol. 6406, 2010, pp. 267-281.*

Emanuele Menegatti, Matteo Danieletto, Marco Mina, Alberto Pretto, Andrea Bardella, Andrea Zanella, Pietro Zanuttigh. "Discovery, Localization and Recognition of Smart Objects by a Mobile Robot" Simulation, Modeling, and Programming for Autonomous Robots Lecture Notes in Computer Science, vol. 6472, 2010, pp. 436-448.*

Menegatti, E.; Danieletto, M.; Mina, M.; Pretto, A.; Bardella, A.; Zanconato, S.; Zanuttigh, P.; Zanella, A., "Autonomous discovery, localization and recognition of smart objects through WSN and image features," GLOBECOM Workshops (GC Wkshps), 2010 IEEE , vol., No., pp. 1653,1657, Dec. 6-10, 2010.*

Jae-Han Park; Baeg, M.H.; Jaehan Koh; Kyung-Wook Park; Moon-Hong Baeg, "A new object recognition system for service robots in the smart environment," Control, Automation and Systems, 2007. ICCAS '07. International Conference on , vol., No., pp. 1083,1087, Oct. 17-20, 2007.*

* cited by examiner

SHARED ROBOT KNOWLEDGE BASE FOR USE WITH CLOUD COMPUTING SYSTEM

CROSS-REFERENCE TO RELATED PATENT APPLICATIONS

This patent application claims priority to U.S. Application No. 61/483,291, filed on May 6, 2011, and U.S. Application 61/588,944 filed on Jan. 20, 2012. The contents of the 61/483, 291 and 61/588,944 applications are entirely incorporated herein by reference, as if fully set forth in this application.

BACKGROUND

Cloud computing refers to the provision of computational resources via a computer network. In a traditional model of computing, both data and software are fully contained on a user's computer. In a cloud computing arrangement, however, the user's computer may contain relatively little software or data (perhaps just a minimal operating system and web browser, for example), and may serve as a display terminal for processes occurring on a network of computers. One common shorthand term used to describe a cloud computing system or service (or even an aggregation of cloud services) is "the cloud."

Cloud computing is sometimes referred to as "client-server computing." However, there are distinctions between cloud computing and general client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients such that a one-to-one relationship or connection may not be required. Thus, cloud computing generally includes client-server computing along with additional services and functionality.

In many situations, cloud computing may free users from certain hardware and software installation and maintenance tasks through the use of simplified hardware on the user's computer. Also, because the user's computer can access a vast network of computing resources (e.g., processors, disk drives, etc.), the user is not limited just to the computing and storage power of his or her local computer. Additionally, the sharing of computing resources across many users may reduce computing costs to individuals. For example, multiple computers connected to the cloud may be able to share the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a web browser and connect to a host of web servers that run user interface software configured to collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

The present application discloses various embodiments of a shared robot knowledge base for use with a cloud computing system and methods for using shared robot knowledge bases with a cloud computing system.

Any of the methods described herein may be implemented in the form of instructions stored on a non-transitory, computer readable media. When executed by a computing device, the instructions may cause the computing device to perform functions of the disclosed method. Further examples may also include articles of manufacture including tangible computer-readable media that have computer-readable instructions encoded thereon, and the instructions may comprise instructions to perform functions of the methods described herein.

The computer readable media may include non-transitory computer readable media, such as computer-readable media that stores data for short periods of time like register memory, processor cache, and Random Access Memory (RAM). The computer readable media may also include non-transitory media, such as secondary or persistent long term storage, like read only memory (ROM), optical or magnetic disks, or compact-disc read only memory (CD-ROM), for example. The computer readable media may also be any other volatile or non-volatile storage system. In some embodiments, the computer readable media may be considered a computer readable storage media, for example, or a tangible storage media.

In addition, some aspects of the disclosed methods may be performed by circuitry configured to perform logical functions in any of the processes or methods described herein. In still further examples, many types of devices may be used or configured to perform logical functions in any of the processes or methods described herein. In yet further examples, many types of devices (and/or components or sub-components of the devices) may be used or configured as means for performing functions of any of the methods described herein (or any portions of the methods described herein).

In some embodiments of the disclosed systems and methods, a cloud computing system may receive a query from a robot. The query may include identification information associated with a particular object. The identification information associated with the object may be any of (i) a name of the object in a sound clip or text excerpt, (ii) image data associated with the object, e.g., a digital image, video clip, point cloud, etc., (iii) information read from a tag or beacon associated with the object, e.g., an RFID tag, an RF or optical beacon, etc., (iv) information read from a bar code or similar code on the surface of the object, e.g., a QR code, a bar code, etc., and/or (v) text or product logos on the surface of the object. The query from the robot may include other identification information associated with the object as well.

After receiving the identification information from the robot, the cloud computing system may in turn use the identification information to query a shared robot knowledge base to determine the identity of the object. The shared robot knowledge base contains data related to an expansive inventory of objects, robot tasks, maps, robot applications, etc. In some embodiments, the shared robot knowledge base includes data about a vast number of various objects that robots may encounter and/or interact with in their everyday environments. The shared robot knowledge base may also include robot instructions for interacting with the objects. For example, the shared robot knowledge base may have data related to various types of furniture, appliances, household objects, utensils, tools, electronic devices, food, supplies, etc. Data about any object that that a robot might encounter or interact with may be included in the shared robot knowledge base.

The data associated with a particular object may vary from object to object. For example, most objects in the shared robot knowledge base have at least a baseline set of data that may include one or more of the object's (i) physical dimensions, weight, material composition, (ii) manufacturer (and possibly model number), (iii) ordering information (if the object is consumable), (iv) relevant tasks that a robot may perform with the object, (v) location of the object, etc. However, the shared object knowledge base may have additional types of data about the objects as well.

Data about objects, robot tasks, maps, and robot applications may be entered and/or updated in the shared robot knowledge base by human operators, computing systems, and/or robots. For example, human operators may enter data into the shared robot knowledge base, e.g., data about objects, robot tasks, maps, and robot applications. Similarly, manufacturers of objects may provide data to the robot knowledge base, e.g., data about objects they manufacture, data about robot equipment they manufacture, etc. One important aspect of the shared robot knowledge base is that robots may also enter data into the shared robot knowledge base, e.g., data about objects they encounter, data about tasks they perform, data for maps associated with their environments, and data about robot applications. For example, when a robot encounters an object that cannot be found in the shared robot knowledge base, then the robot may collect information about the object and send the collected data to the shared robot knowledge base for storage and future retrieval by any other robot authorized to access the uploaded information. In some embodiments, to collect information about the unidentified object may, the robot may ask a human one or more questions about the object. In this manner, information about an object that one robot learns from a human can be shared with other robots authorized to access information about that object. Robots may interact with humans to learn information about maps, robot tasks, and applications in a similar fashion.

In operation, the cloud computing system may be configured to query the shared robot knowledge base to both (i) identify the object corresponding to the identification information received from the robot and (ii) retrieve at least some of the data associated with the identified object. The cloud computing system may send the identity of the object and at least some of the data associated with the identified object to the robot that sent the query.

After receiving the identity of the object and data associated with the object, the robot may use the data associated with the object to interact with the object, e.g., pick up the object, move the object, power on/off the object, open/close doors, drawers, and/or compartments of the object, etc. If, while interacting with the object, the robot determines that some aspect of the received data associated with the object is inaccurate (e.g., the object weighs more or less than indicated, the force required to open/close a door is greater or less than indicated, etc.), then the robot may send feedback to the cloud computing system. In response, the cloud computing system may analyze the feedback, and in some instances, update the data associated with the object in the shared robot knowledge base.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments outlined in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The present disclosure describes cloud based computing methods and systems for use with robots. Within the disclosed examples, cloud based computing generally refers to networked computer architectures where application execution and storage may be divided, to some extent, between robots, client devices, and cloud computing systems. A robot may be any device that has a computing ability and interacts with its surroundings with an actuation capability (e.g., electromechanical capabilities). In some embodiments, a robot may also be configured with various sensors and devices in the form of modules, where different modules may be added or removed from a robot depending on requirements. In some embodiments, a robot may be configured to receive a computing device, such as mobile phone, a smartphone, a laptop computer, and/or a tablet computer, any of which may be configured to function as an accessory of the robot or even as a "brain" of the robot.

In the examples described herein, a robot may interact with the cloud computing system to perform any number of actions, such as to share information with other cloud computing devices or to share information with other robots. For example, a robot may interact with the cloud computing system to facilitate object recognition, to perform a mapping function, or to perform navigational functions (i.e., receive a map/navigation pathway previously traversed by another robot). In other examples, a robot may interact with the cloud computing system to develop a map of objects in an area, to inventory objects in the area, and/or to perform voice recognition by and/or control of a robot.

In some examples, rather than require a robot's knowledge base to be stored onboard the robot, many of the embodiments described herein enable robots to store and access data from a shared robot knowledge base configured for use with the cloud computing system. The cloud computing system may be configured to (i) send and receive data and queries to and from multiple robots, (ii) send data retrieved from the shared robot knowledge base to robots, and (iii) update data in the shared robot knowledge base based on data received from robots.

Cloud Computing System Overview

Figure 1:
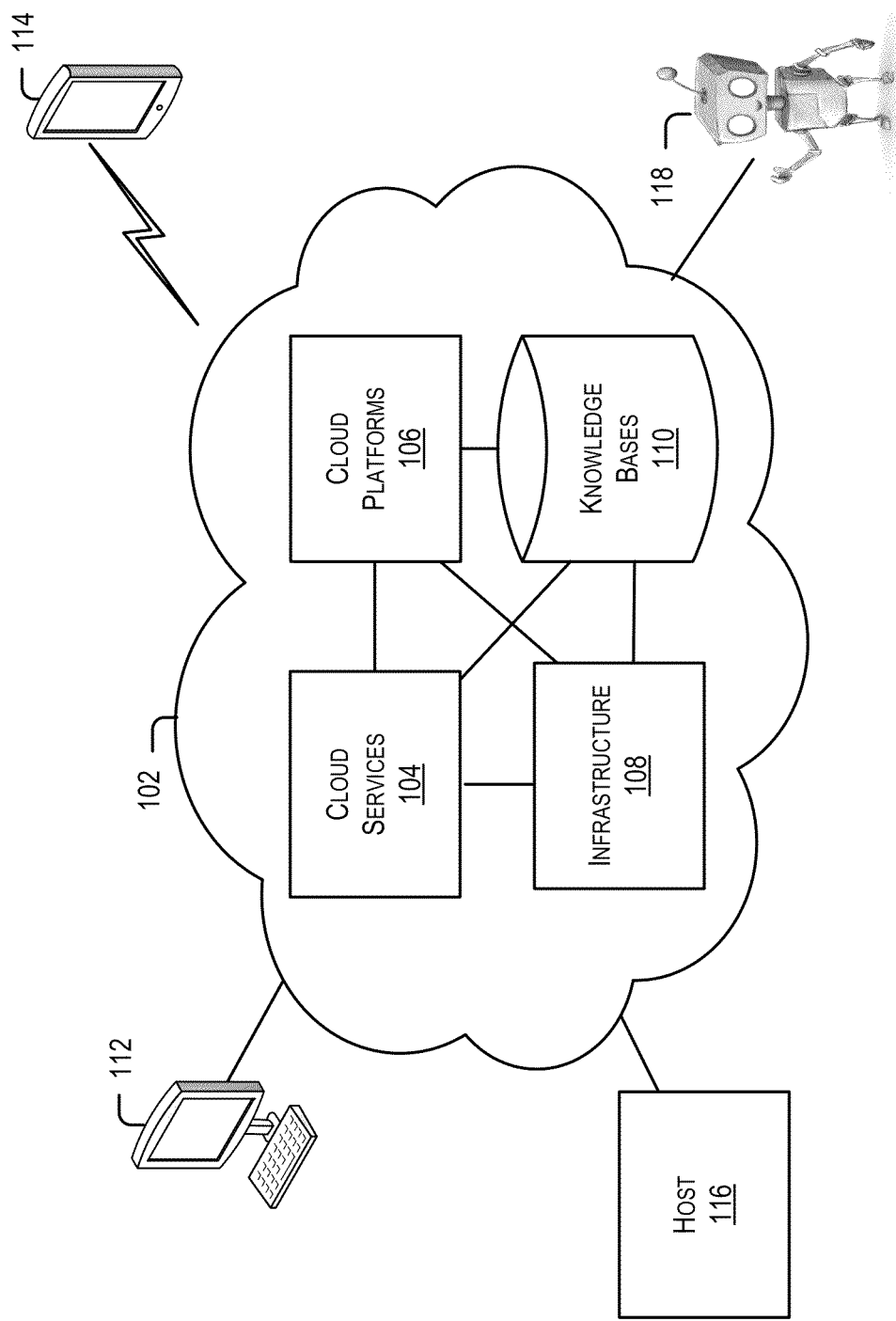
FIG. 1 is a high-level conceptual diagram showing components of a cloud computing system according to some embodiments of the disclosed systems and methods.

FIG. 1 is a high-level conceptual diagram showing components of a cloud computing system 102 according to some embodiments of the disclosed systems and methods. Cloud based computing generally refers to networked computer architectures where application execution, service provision, and data storage may be divided, to some extent, between clients and cloud computing devices. The "cloud" may refer to a service or a group of services accessible over a network (e.g., the Internet) by clients, server devices, and cloud computing systems, for example.

In one example, multiple computing devices connected to the cloud may access and use a common pool of computing power, services, applications, storage, and files. Thus, cloud computing enables a shared pool of configurable computing resources (e.g., networks, servers, storage, applications, and services) that can be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code can be tailored to the capabilities of specific client devices (e.g., a personal computer, tablet computer, mobile phone, smartphone, and/or robot) accessing the cloud based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud based computing architecture may be largely transparent to users of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

In FIG. 1, the cloud computing system 102 includes one or more cloud services 104, one or more cloud platforms 106, cloud infrastructure 108 components, and cloud knowledge bases 110. The cloud computing system 102 may include more of fewer components, and each of the cloud services 104, the cloud platforms 106, the cloud infrastructure components 108, and the cloud knowledge bases 110 may comprise multiple computing and storage elements as well. Thus, one or more of the described functions of the cloud computing system 102 may be divided into additional functional or physical components, or combined into fewer functional or physical components. In some further examples, additional functional and/or physical components may be added to the examples shown in FIG. 1. Delivery of cloud computing based services may involve multiple cloud components communicating with each other over application programming interfaces, such as web services and multi-tier architectures, for example.

The example cloud computing system 102 shown in FIG. 1 is a networked computing architecture. The cloud services 104 may represent queues for handling requests from client devices. The cloud platforms 106 may include client-interface frontends for the cloud computing system 102. The cloud platforms 106 may be coupled to the cloud services 104 to perform functions for interacting with client devices. The cloud platforms 106 may include applications for accessing the cloud computing system 102 via user interfaces, such as a web browser. The cloud platforms 106 may also include robot interfaces configured to exchange data with robot clients. The cloud infrastructure 108 may include service, billing, and other operational and infrastructure components of the cloud computing system 102. The cloud knowledge bases 110 are configured to store data for use by the cloud computing system 102, and thus, the cloud knowledge bases 110 may be accessed by any of the cloud services 104, the cloud platforms 106, and/or the cloud infrastructure components 108.

Many different types of client devices may be configured to communicate with components of the cloud computing system 102 for the purpose of accessing data and executing applications provided by the cloud computing system 102. For example, a computer 112, a mobile device 114, a host 116, and a robot client 118 are shown as examples of the types of client devices that may be configured to communicate with the cloud computing system 102. Of course, more or fewer client devices may communicate with the cloud computing system 102. In addition, other types of client devices may also be configured to communicate with the cloud computing system 102 as well.

The computer 112 shown in FIG. 1 may be any type of computing device (e.g., PC, laptop computer, tablet computer, etc.), and the mobile device 114 may be any type of mobile computing device (e.g., laptop, smartphone, mobile telephone, cellular telephone, tablet computer, etc.) configured to transmit and/or receive data to/from the cloud computing system 102. Similarly, the host 116 may be any type of computing device with a transmitter/receiver including a laptop computer, a mobile telephone, a smartphone, a tablet computer etc., which is configured to transmit/receive data to/from the cloud computing system 102.

The robot client 118 may include any type of computing device that is configured to communicate with the cloud computing system 102 and has an actuation capability (e.g., electromechanical capabilities) for moving about its environment and/or interacting with objects in its environment. In some embodiments, the robot client 118 may include various combinations of computing devices, sensors, and electromechanical actuation elements. In some examples, the robot client 118 may collect data via one or more sensors, and upload the data to the cloud computing system 102 via one or more communications interfaces. The cloud computing system 102 may be configured to analyze data received from the robot client 118, and return processed data to the robot client 118. In some embodiments, a robot client 118 may be configured to send and receive data to a remote host 116 via the cloud computing system 102. In other examples, the robot client 118 may be configured to send/receive data to/from another client device via the cloud computing system 102. For example, the robot client may be configured to send/receive information to/from the computer 112, the mobile device 114, and/or even other robots either directly, indirectly via the cloud computing system 102, or indirectly via other network systems.

Any of the client devices used with the cloud computing system 102 may include additional components. For example, the robot client 118 may include one or more sensors, such as a gyroscope or an accelerometer to measure movement of the robot client 118. Other sensors may further include Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Additionally, any of the client devices may also include a user-interface (UI) configured to allow a user to interact with the client device. For example, the robot client 118 may include various buttons and/or a touchscreen interface configured to receive commands from a human or provide output information to a human. As another example, the robot client 118 may also include a microphone configured to receive voice commands from a human. Furthermore, the robot client 118 may also include one or more interfaces that allow various types of user-interface devices to be connected to the robot client 118. For example, the mobile device 114, the computer 112, and/or the host 116 may be configured to run a user-interface for sending and receiving information to/from the robot client 118 or otherwise configuring and controlling the robot client 118.

In FIG. 1, communication links between client devices and the cloud 102 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with the cloud computing system 102 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices can connect to the cloud computing system 102 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other types of communications interfaces and protocols could be used as well.

Robot Overview

Figure 2A:
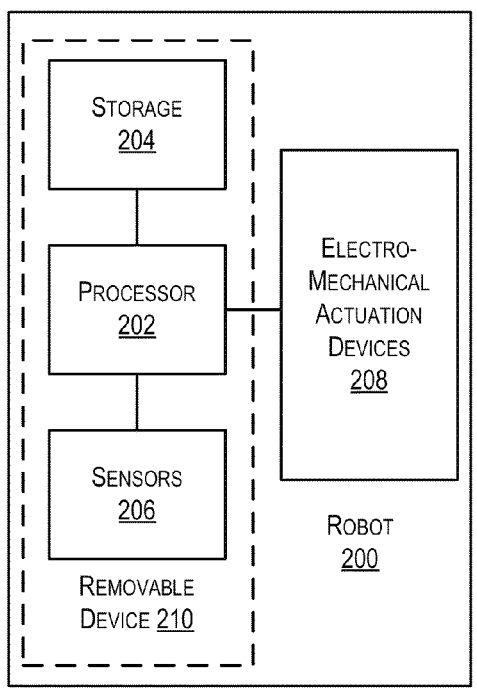
FIG. 2A illustrates a high-level block diagram of a robot according to some embodiments of the disclosed systems and methods.

FIG. 2A illustrates a high-level block diagram of a robot 200 according to some embodiments of the disclosed systems and methods. In the example shown in FIG. 2A, the robot 200 includes a processor 202, memory or storage 204, sensors 206, and electromechanical actuation devices 208. In some embodiments, one or more of the robot components may be custom designed for a specific robot or for a particular model or type of robot. In other embodiments, one or more of the robot components may be generic to many different robots and/or types of robots. The robot 200 may have one or communications interfaces (not shown) for communicating with the cloud computing system 102 (as shown in FIG. 1). The communications interfaces may include wired or wireless interfaces. Examples of wired interfaces include, for example, a parallel interface, a Universal Serial Bus (USB) interface, an Ethernet interface, an optical interface, or any other type of wired communications interface now known or later developed. Examples of wireless interface include, for example, a Bluetooth interface, an IEEE 802.11 (and its variants) interface, a cellular (such as GSM, CDMA, UMTS, EV-DO, WiMAX, or LTE) interface, a Zigbee interface, or any other type of wireless communications interface now known or later developed.

In one embodiment, the storage 204 may be used for storing data from various sensors 206 of the robot 200. The storage 204 may also be used for storing program instructions for execution by the processor 202. The processor 202 may include one or more processors or other data processing subsystems. The processor 202 may be coupled to the storage 204 and may be configured to control the robot 200 based on the program instructions stored at least partially in the storage 204. The processor 202 may also be configured to receive and interpret data from the various sensors 206 on the robot 200. Examples of sensors 206 that may be configured for use on the robot 200 include, for example, smoke sensors, light sensors, radio sensors, infrared sensors, microphones, gyroscopes, accelerometers, cameras, radars, capacitive sensors, touch sensors, or any other type of sensor now known or later developed.

The robot 200 may also have electromechanical actuation devices 208 configured to enable the robot 200 to move about its environment or interact with objects in its environment. For example, the robot 200 may have one or more electromechanical devices 208, such as motors, wheels, movable arms, electromagnets, hands, grasping claws, tool attachments, etc., that enable the robot 200 to move about its environment, interact with objects located in its environment, and/or perform tasks with objects in its environment.

In some embodiments, the various sensors 206 and electromechanical devices 208 on the robot 200 may be modular in nature. For modular sensors 206 and electromechanical devices 208, different modules may be added to or removed from the robot 200 depending on particular requirements. For example, in a low power situation, the robot 200 may remove or perhaps power down one or more modules to reduce power usage. In some situations, the robot 200 may add one or more additional modular electromechanical devices 208 as required. For example, a robot may remove a modular "grasping claw" electromechanical device from its arm, and replace the "grasping claw" electromechanical device with a "tool interface" mechanism configured to accept various tool implements such as a screwdriver, bit driver, knife, wrench, or other tool, etc. to enable the robot to perform a specific task. Similarly, a robot may remove a small-wheeled drive mechanism configured for indoor use, and replace it with a large-wheeled drive mechanism configured for outdoor use. From a sensor standpoint, the robot may remove a camera interface configured for daytime use, and replace it with a night-vision enabled interface configured for use in dark or unlit areas. Other types of modular electromechanical devices 208 and/or modular sensors 206 could be used as well. Robots with modular sensors 206 and electromechanical devices 208 may be advantageous in situations where the robot 200 may need to adapt to different situations and environments and/or use different tools and/or attachments to accomplish various tasks.

In some embodiments, the processor 202, storage 204, and sensors 206 of the robot 200 may optionally be components of a removable device 210 indicated by the dashed line shown in the FIG. 2A. For example, the robot 200 may have a number of mechanical actuation devices 208 (e.g., a movable base, one or more grasping claws, robot hands, etc.), and the robot 200 may be configured to receive a removable device 210 to function as the "brains" or control unit of the robot 200. In some embodiments, the removable device 210 may correspond to a mobile telephone, a smartphone, a tablet computer, a laptop computer, etc. For example, the device 210 may be a smartphone configured to plug in to the robot. When plugged in to the robot, the smartphone may form an interactive display configured to receive commands from a human, for example. The smartphone may also provide a robot with sensors (e.g., a camera, compass, GPS receiver, accelerometer, etc.), one or more wireless communications interfaces, and processing capabilities, for example. In operation, the smartphone may allow a human user to download new routines or "robot applications" (or "robot apps") from the cloud computing system 102 for execution by the robot 200. For example, a user may download a laundry folding "robot app" from the cloud computing system 102 onto the smartphone, for example. Once loaded on the smartphone, the robot 200 can execute the laundry folding "robot app" via the smartphone to perform the functions specified in the "robot app," such as folding laundry in this example.

In some embodiments, the robot 200 may be able to leverage the sensor and communications capabilities of neighboring client devices to supplement or augment its own sensor and communications capabilities. For example, the robot 200 may access a separate smartphone via a Bluetooth connection, and use the smartphone's cellular data network interface to access the cloud computing system 102 shown in FIG. 1. Similarly, the robot 200 may be configured to connect to other sensors to obtain information. For example, the robot 200 may be configured to connect to security system cameras or other sensors positioned near the entrance of a warehouse to monitor the shipments into and out of the warehouse, for example.

Figure 2B:
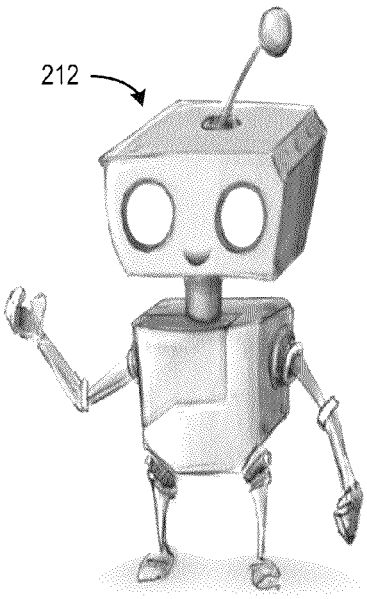
FIG. 2B shows a graphical depiction of an example robot according to some embodiments of the disclosed systems and methods.

FIG. 2B shows a graphical depiction of an example robot 212 according to some embodiments of the disclosed systems and methods. In FIG. 2B, the robot 212 is shown as a mechanical form of a person including arms, legs, and a head. The robot 212 may be configured to receive any number of various modules or components, such a smartphone or tablet computer, which may be configured to operate or control the robot 212, or otherwise be used by the robot 212 for sensor, processing, and/or communications capabilities. In some embodiments, a smartphone (e.g., removable device 210 of FIG. 2A) can be attached to the robot 212 to enable the robot 212 to communicate with the cloud computing system 102 (FIG. 1). Other types of devices that have connectivity to the Internet can be plugged in or otherwise connected to the robot 212 to provide additional communication functionality. In other embodiments, however, the robot 212 may have its own communications interfaces, processors 202, sensors 206, and storage 204 (shown in FIG. 2A) without having to rely on the capabilities of a smartphone or other detachable computing device. In yet further embodiments, the robot 212 may include some combination of its own communications interfaces, processors 202, sensors 206, and storage 204 in cooperation with communications interfaces, processors 202, sensors 206, and storage 204 of a smartphone, tablet computer, laptop, or other removable or detachable communication-enabled computing device.

Figure 2C:
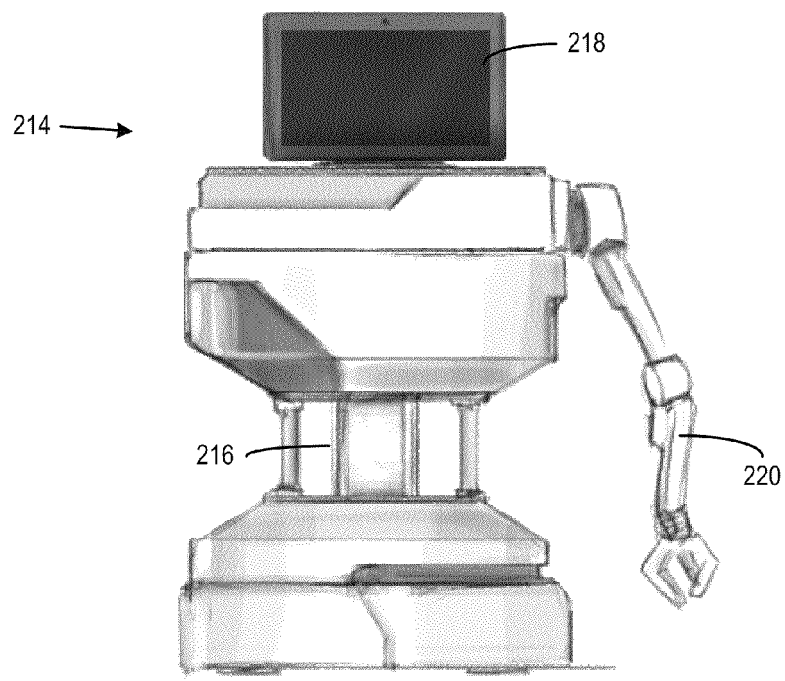
FIG. 2C shows a graphical depiction of another example robot according to some embodiments of the disclosed systems and methods.

FIG. 2C shows a graphical depiction of another example robot 214 according to some embodiments of the disclosed systems and methods. The robot 214 includes a computing device 216, sensors 218, and a mechanical actuator 220. In this example, the computing device 216 may be a laptop or other type of portable computing device which may be configured to receive data from the sensors 218. The sensors 218 may include a camera, infrared sensors, and other motion sensing or computer vision elements. The mechanical actuator 220 may include an arm with a grasping claw or other type of attachment, a base with wheels, and a motor upon which the computing device 216 and the sensors 218 can be positioned, for example.

Any of the robots illustrated in FIGS. 2A-2C may be configured to operate according to a robot operating system, e.g., an operating system designed for specific functions of the robot. A robot operating system may provide libraries and tools (e.g., hardware abstraction, device drivers, visualizers, message-passing, package management, etc.) to enable robots to execute robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples such as ROSJAVA. A robot operating system may include publish and subscribe functionality, and may also include functionality to control components of the robot, such as head tracking, base movement (e.g., velocity control, navigation framework), etc.

Cloud Computing System with Shared Robot Knowledge Base

Figure 3:
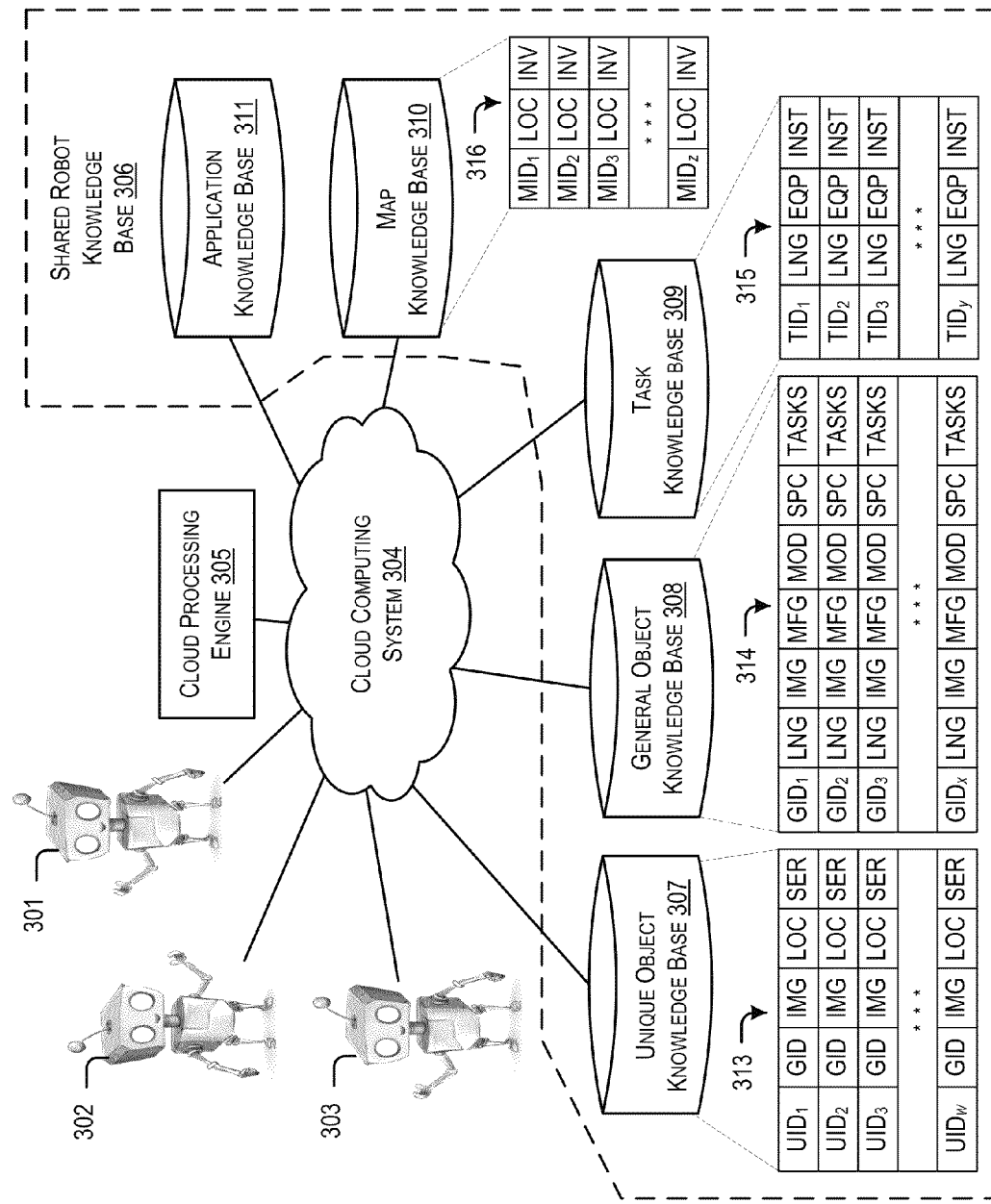
FIG. 3 shows an example of multiple robots interacting with a cloud computing system having a shared robot knowledge base according to some embodiments of the disclosed systems and methods.

FIG. 3 shows an example of multiple robots 301, 302, 303 interacting with a cloud computing system 304 having a shared robot knowledge base 306 according to some embodiments of the disclosed systems and methods.

The robots 301, 302, and 303 shown in the example of FIG. 3 may be similar to any of the robots shown and described herein with respect to FIGS. 1 and 2A-C. In the example shown in FIG. 3, the cloud computing system 304 includes a cloud processing engine 305 and a shared robot knowledge base 306. However, the cloud computing system 304 may have additional components as well. In some embodiments, individual robots, such as robots 301, 302, and 303, may send queries to the cloud computing system 304. In response to receiving queries from robots, the cloud computing system 304 may retrieve data from the shared robot knowledge base 306 and send the retrieved data to the robots in response to their queries. The cloud computing system 304 may also receive data from the robots, and update information in the shared robot knowledge base 306 based on the data received from the robots.

The shared robot knowledge base 306 may include multiple component and/or sub-component knowledge bases. The shared robot knowledge base 306 may contain additional or fewer knowledge bases than the ones shown in FIG. 3. Similarly, the distribution of the information across the various component knowledge bases shown FIG. 3 is merely one example of one embodiment. The contents of the knowledge bases may be combined into a single common knowledge base or distributed across multiple different knowledge bases in a different fashion than described herein. Similarly, in some embodiments, the functionality of the cloud processing engine 305 may be combined with the functionality of the shared robot knowledge base 306 and/or other components of the cloud computing system 304. Additional systems and sub-systems that are not illustrated in FIG. 3 may be utilized to queue and process queries from robots, return data to the robots in response to the received queries, receive data from robots, and update information in the shared robot knowledge base 306 based on the received data.

One important feature of the shared robot knowledge base 306 is that many different robots may access the shared robot knowledge base 306, download information from the shared robot knowledge base 306, and upload information to the shared robot knowledge base 306. Because multiple robots can share the information in the shared robot knowledge base 306, information learned about a particular object by one robot, such as robot 301, can be shared with another robot authorized to access information about that particular object, such as robot 302. As a result, robot 302 benefits from the knowledge added to the shared robot knowledge base 306 by robot 301. In a very simple example, if robot 301 learns that a particular type of hammer weighs 3 pounds, robot 301 can update the information about the weight of the hammer that is stored in the shared robot knowledge base 306. If robot 302 is authorized to access information about hammers, then the next time robot 302 queries the cloud computing system 204 for information about the same type of hammer, then robot 302 will know that the hammer weighs 3 pounds (without having to independently weigh the hammer) based on the data about the type of hammer that was previously uploaded to the shared robot knowledge base 306 by robot 301.

The advantages of a shared robot knowledge base 306 multiply as robots are deployed around the world. If information about a particular object is "public" and therefore accessible by all robots, then information that a single robot learns about that object and uploads to the shared robot knowledge base 306 may be accessible by other robots all around the world. In operation, many millions or even many billions of robots may ultimately access the shared robot knowledge base 306. As a result, the shared robot knowledge base 306 enables robots to benefit from the collective information learned by many other robots.

The example shared robot knowledge base 306 illustrated in FIG. 3 includes: (i) a unique object knowledge base 307; (ii) a general object knowledge base 308; (iii) a task knowledge base 309; (iv) a map knowledge base 310; and (v) an application knowledge base 311.

Unique Object Knowledge Base

Some embodiments of the shared robot knowledge base 306 may include a unique object knowledge base 307. The unique object knowledge base 307 is configured to store data about "unique" objects that a robot may encounter or interact with in its environment.

A "unique" object is an object that can be identified with specificity as being a specific, individual object. For example, a "unique" object might be a specific refrigerator that belongs to a specific person, i.e. John Smith's specific refrigerator. A "unique" object can also be classified as a particular "type" of object such as a particular make and model of refrigerator. But a specific individual refrigerator can be identified as a "unique" object in part because it has an individual manufacturer-assigned serial number or other type of unique identifier that can be used to distinguish it from all other refrigerators of the same "type," e.g., same make and model for example.

By contrast, a "non-unique" object is something that may not be distinguishable from all other objects of its "type." For example, an apple, a flower, a box of cereal, a coffee mug, a pen, a notepad, or other similar objects may not have a unique identifier associated with it. Preferably, a "non-unique" object should not have an entry in the "unique" object knowledge base 307, but it may have an entry in the general object knowledge base 308, as described later.

In the example conceptual data structure 313 for the unique object knowledge base 307 shown in FIG. 3, an individual unique object identifier (UID) may have the following corresponding data: (i) a general object identifier (GID); (ii) image data (IMG); (iii) location data (LOC); and (iv) serial number data (SER). Various embodiments of the unique object knowledge base 307 may contain more or less data corresponding to a particular unique object identifier (UID). For example, in some embodiments, the unique object knowledge base 307 may have many more additional categories of data than the categories shown in conceptual data structure 313. Similarly, the unique object knowledge base 307 may store more or less data for some unique objects as compared to the data stored for other unique objects.

The unique object identifier (UID) is an identifier corresponding to a specific, "unique" object. Because each unique object identifier (UID) corresponds to a specific, "unique" object, the unique object knowledge base 307 may contain many billions of unique object identifiers (UID).

In some embodiments, the unique object knowledge base 307 may be indexed by unique object identifiers (UID). However, the unique object knowledge base 307 could alternatively be indexed by other identifiers or attributes as well. In operation, two "unique" objects should not have the same unique object identifier (UID); however, two "unique" objects may have the same corresponding general object identifier (GID). Individual unique object identifiers (UID) may have a corresponding general object identifier (GID) that can be cross-referenced in the general object knowledge base 308 described later.

Although not required, separating data corresponding to "unique" objects in the unique object knowledge base 307 from data corresponding to "non-unique" objects in the general object knowledge base 308 may have advantages in some embodiments in terms of data management and system performance. Separating data corresponding to "unique" objects and "non-unique" objects into separate knowledge bases may also have advantages from an information security standpoint in embodiments where it might be desirable to limit or restrict access to data about "unique" objects to certain robots while granting access to data about "non-unique" objects to all robots. However, in other embodiments, it may be advantageous to include data corresponding to "unique" objects and "non-unique" objects in a common knowledge base, thus, combining the functionality and data of the unique object knowledge base 307 and the general object knowledge base 308 into a single object knowledge base.

In the example conceptual data structure 313 shown in FIG. 3, an individual unique object identifier (UID) may have a corresponding general object identifier (GID). The general object identifier (GID) defines a "type" of object. In the unique object knowledge base 307, the general object identifier (GID) defines the "type" of "unique" object that corresponds to the unique object identifier (UID).

The distinction between a unique object identifier (UID) and its corresponding general object identifier (GID) can be illustrated with the following example of two Motorola®DROID X smartphones. The first DROID X smartphone may have a unique object identifier (UID) that is different than the unique object identifier (UID) of the second DROID X smartphone because each of the first and second DROID X smartphones can be uniquely identified. However, both of the two DROID X smartphones may have the same corresponding general object identifier (GID) because both of the two smartphones are the same "type" of object, i.e., a Motorola® DROID X smartphone.

The distinction between a unique object identifier (UID) and its corresponding general object identifier (GID) may be further illustrated by considering a third, different smartphone: a Motorola® DROID BIONIC smartphone. A specific DROID BIONIC smartphone will have a different corresponding general object identifier (GID) than the general object identifier (GID) of the two DROID X smartphones because the DROID BIONIC smartphone is a different "type" of object than the DROID X smartphones, i.e., one is a DROID BIONIC smartphone whereas the other two are DROID X smartphones. Of course, each of the DROID X and the two DROID BIONIC smartphones will have its own unique object identifier (UID) because each of the three smartphones is a "unique" object that can be uniquely and specifically identified. For example, each of the three smartphones may be uniquely and specifically identified by any of their corresponding Electronic Serial Numbers (ESN), model serial numbers, WiFi MAC addresses, or Bluetooth addresses, for example. Different types of objects may be uniquely identifiable by other numbers, identifiers, or methods.

An individual unique object identifier (UID) in the example conceptual data structure 313 of the unique object knowledge base 307 shown in FIG. 3 may also have corresponding image data (IMG). A particular unique object identifier's (UID) corresponding image data (IMG) may include one or more images, video clips, 3D models, point clouds, or other graphical representations of the unique object.

The image data (IMG) may be used in connection with object recognition algorithms executed by the cloud processing engine 305 to identify a "unique" object in response to a query from a robot. For example, a robot may send an image (or other graphical representation) of an object to the cloud processing engine 305 with a request or query to identify the object in the image. In response to the query from the robot, the cloud processing engine 305 may analyze the image and find any matching images (or other matching image data) from the image data (IMG) in the unique object knowledge base 307 to determine whether the object in the image data received from the robot corresponds to a unique object identifier (UID) in the unique object knowledge base 307. If the cloud processing engine 305 finds matching (or sufficiently similar) image data in the unique object knowledge base 307 to conclude that the object in the image data received from the robot corresponds to a "unique" object in the unique object knowledge base 307, then the cloud processing engine 305 may send the robot a response to the query. The response may include (i) the identity of the "unique" object and (ii) data corresponding to the "unique" object.

In some embodiments, a robot may also add to the image data (IMG) for a corresponding unique object identifier (UID). For example, if a person tells a robot that a particular laptop computer is his or her laptop (e.g., "Hey, robot, this is my laptop."), the robot may capture an image of the person's laptop and upload the captured image to the shared robot knowledge base 306. Because the person's laptop is a "unique" object, the image data (IMG) along with other information that the robot might learn about the laptop may be stored in the unique object knowledge base 307 with a unique object identifier (UID).

An individual unique object identifier (UID) in the example conceptual data structure 313 of the unique object knowledge base 307 shown in FIG. 3 may also have corresponding location data (LOC). The location data (LOC) corresponding to a particular unique object identifier (UID) in the unique object knowledge base 307 corresponds to the location of the unique object. The location data (LOC) may include GPS coordinates and/or other location-based information, e.g., an association with (or a link to) one or more maps stored in the map knowledge base 310. As described in more detail herein, maps in the map knowledge base 310 may include information about a particular building or house, a particular location in the building or house, a location in a room of the building or house, and a location in a drawer, shelf, cabinet, closet, box, or trunk, etc. in the room of the building or house.

The location data (LOC) in the unique object knowledge base 307 may be as general or as specific as desired for the particular unique object. For example, location data (LOC) corresponding to a "unique" car may include GPS coordinates indicating the last recorded location of the car. The location data (LOC) may also include links or other associations to one or more maps in the map knowledge base 310 that show the car located in a particular parking spot on a particular floor of a particular parking garage located at a particular address. In another example, location data (LOC) corresponding to a "unique" musical instrument may include GPS coordinates and links to map information in the map knowledge base 310 that describe the "unique" instrument's location in a case on a particular shelf of a closet in a particular room in a particular house, for example. Other types of location data (LOC) corresponding to "unique" objects may be contained in the unique object knowledge base 307 as well.

An individual unique object identifier (UID) in the conceptual data structure 313 of the unique object knowledge base 307 shown in FIG. 3 may also have corresponding serial number data (SER). The serial number data (SER) corresponding to a particular unique object identifier (UID) in the unique object knowledge base 307 may include a manufacturer-assigned serial number of the "unique" object corresponding to the particular unique object identifier (UID).

Most objects of any significant economic value (and even some objects of nominal economic value) have a manufacturer-assigned serial number designed to distinguish a particular object from other similar objects of the same type. For example, two refrigerators of the same type (i.e., same manufacturer, same model, etc.) will have two different manufacturer-assigned serial numbers so that the first refrigerator can be distinguished from the second refrigerator. Similarly, two cars of the same type (i.e., same manufacturer, same model, etc.) will have two different manufacturer-assigned vehicle identification numbers (VIN). The two cars may also have different license plate numbers that could additionally or alternatively be used to identify each car as a specific, unique car.

For objects that may not have a manufacturer-assigned serial number, another assigned number or identifier could be used instead. For example, a person could affix an RFID tag to a "unique" antique rocking chair so that the identification information read from the RFID tag in effect becomes the de facto serial number of the "unique" antique rocking chair. Other types of unique identifiers could be assigned to or otherwise associated with "unique" objects that may not have a manufacturer-assigned serial number.

General Object Knowledge Base

Some embodiments of the shared robot knowledge base 306 may include a general object knowledge base 308. The general object knowledge base 308 is configured to store data about different "types" of objects that a robot may encounter or interact with in its environment, including different "types" of "unique" and "non-unique" objects.

As described previously, a "unique" object is an object that can be identified with specificity as being a specific, individual object. By contrast, a "non-unique" object is something that may not be distinguishable (at least in any practical manner) from all other objects of its same "type."

For example, a can of soda may be a "non-unique" object. Even though the can of soda can easily be identified as a particular "type" of object based on, for example, a Universal Product Code (UPC) on the soda can, there may be no practical way to distinguish one can of Coca-Cola® from any other can of Coca-Cola®. Another "non-unique" object may be a coffee mug in an office. The office may have hundreds of largely identical coffee mugs on multiple floors of the office building or even multiple buildings in an office campus. Each coffee mug can be easily identified as a particular "type" of mug based on its color, shape, and perhaps company logo on the exterior of the mug. However, there may be no practical way to distinguish one mug from any other mug.

It should be noted that individual cans of soda or individual coffee mugs could, in some embodiments, be equipped with unique identifiers, e.g., RFID tags, unique QR codes, or other unique identifiers. If so, data about each "unique" can of soda or each "unique" coffee mug could be stored in the unique object knowledge base 307. However, it may not be practical or even desirable to collect and maintain data about hundreds (or even billions in the soda can example) of largely identical items.

In the conceptual data structure 314 for the general object knowledge base 308 shown in FIG. 3, an individual general object identifier (GID) may have the following corresponding data: (i) language data (LNG); (ii) image data (IMG); (iii) manufacturer data (MFG) (if applicable); (iv) model number data (MOD) (if applicable); (v) specification data (SPC); and (vi) task data (TASKS). In some embodiments, the conceptual data structure 314 of the general object knowledge base 308 may contain more or less information than the example shown in FIG. 3.

A general object identifier (GID) is a unique identifier corresponding to a particular "type" of object. Because each general object identifier (GID) corresponds to a particular "type" of object, the general object knowledge base 308 may contain many billions of different general object identifiers (GID).

To follow the earlier smartphone example, a particular "type" of smartphone, e.g., a Motorola® DROID X smartphone, has a specific (and preferably unique) general object identifier (GID). The DROID X smartphone would have a different general object identifier (GID) than a Motorola® DROID BIONIC smartphone because the DROID X is a different "type" of smartphone than the DROID BIONIC. Similarly, a particular "type" of car, e.g., a Ford® Fusion, would have a specific (and preferably unique) general object identifier (GID). For example, the Ford® Fusion would have a different general object identifier (GID) than a Ford® Mustang because the Fusion is a different "type" of car than the Mustang.

Other less-complex "types" of objects may have a specific (and preferably unique) general object identifier (GID) as well, including objects such as particular "types" of cups, glasses, mugs, dishes, utensils, tools, pencils, etc. For example, a coffee mug designed to hold 16 ounces of liquid would have a different general object identifier (GID) than a coffee mug designed to hold 12 ounces of liquid because the 16 ounce mug is a different "type" of mug than the 12 ounce mug. Similarly, a short, wide coffee mug designed to hold 16 ounces of liquid may have a different general object identifier (GID) than a tall, narrow coffee mug also designed to hold 16 ounces of liquid because the short, wide mug is a different "type" of mug than the tall, narrow mug. Also, certain "types" of foods may have a specific (and preferably unique) general object identifier (GID). For example, different "types" of apples may have different corresponding general identifiers (GID) in the general object knowledge base 308, i.e., "McIntosh," "Granny Smith," "Fuji," "Red Delicious," "Golden Delicious," "Braeburn," "Reinette d'Orléans," etc. apples would each have a different (and preferably unique) corresponding general object identifier (GID).

As described above, an individual general object identifier (GID) in the conceptual data structure 314 of the general object knowledge base 308 shown in FIG. 3 may have corresponding language data (LNG). The language data (LNG) in the general object knowledge base 308 may include one or more words, names, terms, and/or synonyms associated with the particular type of object corresponding to the general object identifier (GID). The language data (LNG) may be used in connection with speech and/or text recognition algorithms executed by the cloud processing engine 305 when trying to identify a particular type of object in response to a query from a robot. For example, a robot may send a query to the cloud computing system 304. The query may include a recorded sound clip referring to an object (e.g., a sound recording corresponding to instructions or commands received from a human) or a text excerpt (e.g., text read from packaging on an object or a sign associated with the object). In response to the query from the robot, the cloud processing engine 305 may analyze the sound clip or text excerpt received from the robot, and then find matching (or at least substantially similar) language data (LNG) in the general object knowledge base 308.

For example, the general object identifier (GID) associated with a particular type of refrigerator may have corresponding language data (LNG) that includes the terms "refrigerator," "freezer," "fridge," "icebox," etc. Similarly, the general object identifier (GID) associated with a Motorola® DROID X smartphone may have corresponding language data (LNG) that includes the terms "phone," "telephone," "cell," "cellphone," "cellular phone," "cellular telephone," "mobile," "mobile phone," "mobile telephone," "smartphone," "DROID," "DROID phone," "DROID X," "Android," "Android phone," etc. Additionally, the language data (LNG) may have terms that account for differences in regional dialects. For example, the general object identifier (GID) associated with can of Pepsi® may have corresponding language data (LNG) that includes the terms "Pepsi®," "soda," "pop," "soda pop," "soft drink" and "coke." Even though a Pepsi® is not a Coca-Cola®, people in some areas may colloquially refer to a Pepsi® as a "coke" in general. The language data (LNG) may also have terms that account for different languages. Thus, some general object identifiers (GID) may have more or less corresponding language data (LNG) that other general object identifiers (GID).

An individual general object identifier (GID) in the conceptual data structure 314 of the general object knowledge base 308 shown in FIG. 3 may also have corresponding image data (IMG). The image data (IMG) in the general object knowledge base 308 may include one or more images, 3D models, point clouds, or other graphical representations associated with the particular type of object corresponding to the general object identifier (GID). Like the language data (LNG) described above, the image data (IMG) may also be used by object recognition algorithms. In particular, the image data (IMG) may be used in connection with image recognition algorithms executed by the cloud processing engine 305 to identify a particular object in response to a query from a robot.

For example, a robot may send an image of an object (or other image data corresponding to the object) to the cloud processing engine 305 with a request or query to identify the object in the image. In response to the query from the robot, the cloud processing engine 305 may analyze the image data received from the robot and find matching (or at least substantially similar) images (or other matching graphical data) from the image data (IMG) in the general object knowledge base 308 to determine whether the object in the image data received from the robot corresponds to a general object identifier (GID) in the general object knowledge base 308. If the cloud processing engine 305 finds matching (or sufficiently similar) image data in the general object knowledge base 308 to conclude that the object in the image data received from the robot corresponds to a particular "type" of object in the general object knowledge base 308, then the cloud processing engine 305 may send the robot a response to the query. The response may include (i) an identification of the "type" of object and (ii) data corresponding to the "type" of object.

An individual general object identifier (GID) in the conceptual data structure 314 of the general object knowledge base 308 shown in FIG. 3 may also have corresponding manufacturer data (MFG) and model data (MOD) if applicable. The manufacturer data (MFG) may include the manufacturer, maker, builder, or producer associated with the particular type of object corresponding to the general object identifier (GID). The manufacturer data (MFG) may also include information about the object's manufacturer, maker, builder, producer, etc. (e.g., manufacturer contact information, website, etc.). Similarly, the model data (MOD) may include a model number, variant, or other useful designation assigned to a particular type of object by the object's manufacturer, maker, builder, producer, etc.

For example, the manufacturer data (MFG) corresponding to the general object identifier (GID) for a Ford® Mustang car may include data associated with the Ford Motor Company, e.g., "Ford," "http://www.ford.com/", or other similar data. Similarly, the model data (MOD) corresponding to the general object identifier (GID) for a Ford® Mustang car may include data associated with a particular model, e.g., "2012," "Boss 302," a factory model designation, or other similar data associated with the particular model of car. In another example, the manufacturer data (MFG) corresponding to the general object identifier (GID) for a paper coffee cup manufactured by Georgia-Pacific may include data associated with Georgia-Pacific, e.g., "Georgia-Pacific", "http://www.gp.com/, or other similar data. The model data (MOD) corresponding to the general object identifier (GID) for the paper coffee cup may include data associated with the particular product number of the cup. In some embodiments, some manufacturers may even choose to provide the shared robot knowledge base 306 with a link to a proprietary or private database of information about a particular product so that any updates that the manufacturer might make to the specifications of the product can be accessed by robots via the shared robot knowledge base 304.

Some "types" of items may not have a manufacturer or model number. For example, the different general object identifiers (GID) for the different "types" of apples described above may not have corresponding manufacturer data (MFG) or model data (MOD). However, in some instances, a coded sticker affixed to the apple may contain information associated with a particular apple farm, e.g., "Happy Time Apple Farms," and a harvest date, "Oct. 15, 2011." In such a situation, a general object identifier (GID) for apples from "Happy Time Apple Farms" may have manufacturer data (MFG) associated with "Happy Time Apple Farms" and model data (MOD) associated with the "Oct. 15, 2011" harvest date. However, other apples without coded stickers may not have corresponding manufacturer (MFG) or model data (MOD).

An individual general object identifier (GID) in the conceptual data structure 314 of the general object knowledge base 308 shown in FIG. 3 may also have corresponding specification data (SPC). The specification data (SPC) may include physical attributes associated with the particular "type" of object corresponding to the general object identifier (GID). For example, specification data (SPC) may include many different physical attributes of a particular "type" of object, e.g., physical dimensions (height, width, depth, shape, volume, area, etc.), weight, mass, color, texture, material composition, etc.

For example, a particular "type" of coffee mug may have a height (6 inches), width (4 inches), shape (cylindrical), volume (16 ounces), weight (¼ pound), color (silver), texture (smooth), and material composition (stainless steel), etc. Other more complex types of objects may have additional specification data (SPC) above and beyond the basic physical attributes described above. For example, in addition to the basic physical attributes described above, a car may additionally have more complex specification data (SPC) including miles per gallon, acceleration, top speed, gas tank capacity, trunk capacity, seating capacity, tire air pressure, etc. In another example, the specification data (SPC) associated with a particular "type" of apple may include average weight, shape, nutritional information, etc. Thus, the specification data (SPC) corresponding to some general object identifiers (GID) may be quite extensive (particularly for complex objects), whereas the specification data (SPC) corresponding to other general object identifiers (GID) may be fairly limited (particularly for less complex objects).

An individual general object identifier (GID) in the conceptual data structure 314 of the general object knowledge base 308 shown in FIG. 3 may also have corresponding task data (TASKS). The task data (TASKS) may correspond to tasks that can be performed with the object corresponding to the general object identifier (GID). Thus, the task data (TASKS) associated with a particular general object identifier (GID) defines the types of interactions that a robot may execute with the physical object corresponding to the general object identifier (GID).

Different types of objects may have different task data (TASKS) stored in the general object knowledge base 308. For example, a general object identifier (GID) associated with a type of paper cup may have task data (TASKS) corresponding to tasks such as (i) grasping the cup, (ii) filling the cup with liquid, (iii) pouring liquid from the cup, (iv) transporting the cup, (v) setting the cup on a surface, (vi) crushing the cup, and (vii) dropping the cup into a trashcan, for example. However, a general object identifier (GID) associated with a refrigerator may have entirely different task data (TASKS) corresponding to tasks such as (i) opening the refrigerator door, (ii) opening the freezer door, (iii) opening a drawer inside the refrigerator, (iv) closing a drawer inside the refrigerator, (v) closing the freezer door, (vi) closing the refrigerator door, (vii) activating/deactivating the ice dispenser, and (viii) activating/deactivating the water dispenser, for example. Furthermore, a general object identifier (GID) associated with a refrigerator that does not have a water or ice dispenser may not have corresponding task data (TASKS) corresponding to tasks associated with water or ice dispensers, such as activating/deactivating the ice dispenser or water dispenser, for example.

Particularly complex objects, such a car, may even have corresponding task data (TASKS) that includes robot instructions for driving the car. As a result, when a robot (with the assistance of the cloud computing system 304) identifies a particular car, the robot may also be able to access instructions for driving that particular type of car. In this example, task data (TASKS) for driving a car may include physical movements, e.g., grasping and turning a steering wheel, grasping and moving a transmission controller to put the gar in gear, etc. However, because many new cars are electronically controlled, the robot may be able to simply connect to the car via a wireless or wired communications link, and pilot the car electronically rather than having to manually control a steering wheel, gas pedal, or break pedal. Other similarly complex objects may have similar communications capabilities such that the task data (TASKS) associated with those objects may include instructions for connecting to the object via a communications channel (wireless or wired) and controlling the object via commands sent via the communications channel. For example, a robot could control a communication-enabled television, microwave oven or stove, clothes washer/drier, dish washer, home lighting system, home security system, or any other type of communications-enable device.

In some embodiments, the task data (TASKS) may include instruction code for controlling and operating grasping claws, robot hands, tool/utensil attachments, rolling bases, or other similar types of electromechanical actuation device configured for use with a robot. The task data (TASKS) may also include instruction code for controlling and operating various sensors on a robot, such as any of the sensors described herein. In some embodiments where the task data (TASKS) includes robot instruction code for performing tasks, the shared robot knowledge base 304 may not require a separate task knowledge base 309.

However, in some embodiments, the task data (TASKS) may include (i) task identifiers (TID) corresponding to instruction code that can be looked up in a separate task knowledge base 309 and (ii) task values corresponding to a particular task identifier (TID). Thus, the task identifier (TID) may correspond to a "generic" task (e.g., "grasping"), while the task values may "customize" the generic task to a particular object. For example, with respect to the "grasping" task described above for the paper cup, the tasks data (TASKS) may include (i) a task identifier (TID) corresponding to a generic grasping task and (ii) task values for using the generic grasping task with the particular paper cup.

For example, if a robot needed to pick up the paper cup, the instructions for the "grasping" task may retrieved from the task knowledge base 309 based on the task identifier (TID) for the "grasping" task stored in the general object knowledge base 308 for the general object identifier (GID) associated with the paper cup. Then, the general "grasping" task can be customized for use with the paper cup by executing the "grasping" task with the task values that are specific to the paper cup. For example, the task values specific to the paper cup may include values for variables in the generic "grasping" task instructions retrieved from the task knowledge base 309. These task values may define the position and attitude of a grasping claw when approaching the paper cup, how wide to open the grasping claw to position the fingers of the claw around the paper cup, the amount of force to apply when closing the fingers of the grasping claw around the paper cup, and how much to close the fingers of the grasping claw around the paper cup, for example.

In some embodiments, the cloud computing system may be configured to synthesize or generalize task data (TASKS) associated with a particular object based on its similarity to other objects stored in the general object knowledge base 308.

For example, to use the cup examples above, a first cup designed to hold 16 ounces of liquid would have a different general object identifier (GID) than a second cup designed to hold 12 ounces of liquid. The two types of cups may also have slightly different task data (TASKS) as well. If the robot encounters a new third cup that cannot be identified by the cloud computing system 304, then the robot may collect specification data (SPC) about the cup for uploading to the shared robot knowledge base 306 where the new third cup can be associated with a new general object identifier (GID). Based on the degree of similarity between the new third cup and the two known cups (the 16 ounce cup and the 12 ounce cup), the cloud computing system 304 may generate estimated task data (TASKS) for the new third cup. For example, "grasping" the new third cup is probably similar to grasping the two known cups. The next time that a robot encounters a cup of the same type as the new third cup and queries the cloud computing system 304, the cloud computing system 304 should be able to identify the cup and send data about the cup to the robot that sent the query.

Task Knowledge Base

As described above, some embodiments of the shared robot knowledge base 306 may include a task knowledge base 309. The task knowledge base 309 may be configured to store data and task instruction code associated with different tasks that a robot may perform to interact with objects in its environment.

In the conceptual data structure 315 for the task knowledge base 309 shown in FIG. 3, an individual task identifier (TID) may have the following corresponding data: (i) language data (LNG); (ii) equipment data (EQP); and (iii) instruction data (INST). In some embodiments, the conceptual data structure 315 of the task knowledge base 309 may contain more or less information than the example shown in FIG. 3.

As described above, a task identifier (TID) corresponds to a particular task that a robot may perform to interact with an object in its environment. For example, tasks may include grasping an object, placing an object on a surface, opening a door, closing a door, opening a drawer, closing a drawer, pushing an object, pulling an object, lifting an object, rotating an object, throwing an object, catching an object, traveling to an object, etc. Tasks may also include non-physical interactions with an object, such as establishing a communications channel with an object, sending data to an object, retrieving data from an object, etc. Because each task identifier (TID) corresponds to a particular task, the task knowledge base 309 may have many billions of task identifiers (TID) corresponding to tasks that different types of robots equipped with different types of electromechanical devices may perform or execute with the various objects in the unique object knowledge base 307 and the general object knowledge base 308.

As described above, an individual task identifier (TID) in the conceptual data structure 315 of the task knowledge base 309 shown in FIG. 3 may have corresponding language data (LNG). The language data (LNG) in the task knowledge base 309 may include one or more words, names, terms, and/or synonyms associated with the particular task corresponding to the task identifier (TID). The language data (LNG) may be used in connection with speech and/or text recognition algorithms executed by the cloud processing engine 305 when trying to identify a particular task received in a query from a robot. For example, a robot may send a query to the cloud processing engine 305. The query may include a recorded sound clip referring to a task (e.g., a sound recording corresponding to instructions or commands received from a human) or a text excerpt (e.g., text read from a command). In response to the query from the robot, the sound processing engine 305 may analyze the sound clip or text excerpt received from the robot, and then find matching (or at least substantially similar) language data (LNG) in the task knowledge base 309 to identify the corresponding task.

An individual task identifier (TID) in the conceptual data structure 315 of the task knowledge base 309 shown in FIG. 3 may also have corresponding instruction data (INST). The instruction data (INST) may include robot executable instruction code for controlling and operating grasping claws, robot hands, tool/utensil attachments, rolling bases, or other similar types of electromechanical actuation device configured for use with a robot. The instruction data (INST) may also include instruction code for controlling and operating various sensors on a robot, such as any of the sensors described herein.

Task instruction data (INST) may be specific to particular robot modules. In particular, different electromechanical actuation devices may execute different instruction code depending on the type of electromechanical actuation device. For example, the instruction code executed by a two-finger claw to "grasp" a cup may be different than the instruction code executed by a five-finger robot hand to "grasp" a cup because of the differences between the features and electromechanical capabilities of the two devices. However, both devices may be capable of performing a "grasp" task.

Because different electromechanical actuation devices may execute different instruction code, individual task identifiers (TID) in the conceptual data structure 315 of the task knowledge base 309 shown in FIG. 3 may also have corresponding equipment data (EQP). The equipment data (EQ) may include information about the type of electromechanical actuation device that can execute the instruction data (INST) corresponding to a particular task identifier (TID) in the task knowledge base.

Map Knowledge Base

As describe above, the shared robot knowledge base 306 may also have a map knowledge base 310. The map knowledge base 310 may include inventories of objects located in areas corresponding to different maps.

The conceptual data structure 316 for the map knowledge base 310 shown in FIG. 3 includes: (i) map identifiers (MID); location data (LOC) and (ii) inventory data (INV). In some embodiments, the conceptual data structure 316 of the map knowledge base 310 may contain more or less information than the example shown in FIG. 3.

An individual map identifier (MID) may correspond to a unique map, which may correspond to a defined area. In some embodiments, an area may be defined by a set of GPS coordinates or other similar location determination mechanisms. For example, one map may correspond to a particular apartment. The map of the apartment may have related higher-level and lower-level maps. For example, the map of the apartment may have a related higher-level map for the floor of an apartment building. The map of the apartment may have multiple related lower-level maps, such as a map for the kitchen of the apartment, a map for the living room of the apartment, and a map for a bedroom of the apartment. The map of the kitchen may also have related lower level maps, such as individual maps for individual cabinets and drawers in the kitchen. A cabinet may have an even lower-level related map for a box located inside the cabinet or a table in the kitchen, for example.

Individual map identifiers (MID) may also have corresponding location data (LOC). The location data (LOC) may correspond to GPS coordinates associated with the particular map. Location coordinates other than GPS could be used as well.

Individual map identifiers (MID) may also have corresponding inventory data (INV). The inventory data (INV) may correspond to inventories of objects associated with the map. For example, a cabinet in a kitchen may have a collection of plates, saucers, and cups. The inventory data (INV) may include information associated with the number and type of each plate, saucer, and cup in the particular cabinet. Objects such as the particular plate, the particular saucer, and the particular cup may have corresponding general object identifiers (GID) in the general object knowledge base 308. If the cabinet has 8 plates, 6 saucers, and 10 cups, the inventory data (INV) associated with the map of the cabinet may include quantities of each of the particular general object identifiers (GID) corresponding the plates, saucers, and cups. Because information about the plates, saucers, and cups is contained in the general object knowledge base 308, object-specific information does not need to be reproduced in the map knowledge base 310. Instead, detailed information about the objects in the cabinet can be obtained from the general object knowledge base 308. Similarly, detailed information about how to interact with the objects can be obtained from the task knowledge base 309.

In some embodiments, access to certain maps and/or inventory data associated with those maps may be limited or restricted to certain robots while other maps and their corresponding inventory data may be freely accessible by all robots. For example, a person may restrict access to maps and inventory data associated with his or her apartment to all robots except for a small number of robots that the person owns or regularly uses. Similarly, a store owner may grant access to maps and inventory data associated with public areas of his or her store to all robots but restrict access to maps and inventory data associated with non-public areas of the store to a limited number of trusted robots.

Because most people would likely choose to restrict access to map and inventory data associated with their homes to only a few selected robots, in practice, an individual robot would likely be unable to access the overwhelming majority of data stored in the map knowledge base 310. However, the cloud computing system 304 can be configured to anonymize the data stored in the map knowledge base 310 to provide generalized statistics to facilitate robot learning and operation. For example, if an individual robot is unsure about where to store a carton of ice cream, a query to the map knowledge base 310 may conclude that most people store ice cream in a freezer based on anonymized inventory data (INV) across many maps. Thus, without knowing exactly who may have ice cream in their freezer, the cloud computing system 304 can still provide useful instructions to the robot (i.e., store the ice cream in the freezer) based on anonymized inventory data (INV) in the map knowledge base 310.

Application Knowledge Base

Some embodiments of the shared robot knowledge base 306 may also include an application knowledge base 311. In some embodiments, the application knowledge base 311 may be one component of a robot application store from where robot users may purchase and download robot applications for installation and/or execution by on their robots. In other embodiments, the application knowledge base 311 may be separate from the robot application store.

The application knowledge base 311 may include different robot applications that can be performed by a robot. In some embodiments, some applications in the application knowledge base 311 may include a collection of tasks (and/or customized versions thereof) from the task knowledge base 316 to be performed with certain objects from the general object knowledge base 308 or the unique object knowledge base 307. Some applications in the application knowledge base 311 may even include a collection of other application (and/or customized versions thereof) from the application knowledge base 311. The applications in the application knowledge base 311 may not be limited only to collections of (i) tasks stored in the task knowledge base 309, (ii) objects stored in the unique object knowledge base 307 and/or the general object knowledge base 308, and/or (iii) other applications stored in the application knowledge base 311. However, applications that rely on objects, tasks, and applications stored elsewhere in the shared robot knowledge base 306 may benefit from updates to object, task, and application information by humans and/or robots, as described herein.

One example of an application that may reside in the application knowledge base 311 might be an application named "Groceries" that includes robot instructions for removing groceries from shopping bags and storing the groceries in their appropriate places in a person's home. In some embodiments, a robot programmer may write the "Groceries" application, and then publish the application in the application knowledge base 311.

In operation, a robot may download the "Groceries" application from the application knowledge base 311 (or alternatively execute the "Groceries" application via the cloud computing system 304). Although the "Groceries" application may have been written by a robot programmer, a person may "coach" the robot as it executes the "Groceries" application. For example, if the robot cannot identify a particular grocery item, the robot may ask the person what the grocery item is and where the grocery item should be stored. Based on the response from the person, the robot may update information in the object knowledge base 308 regarding the identity of the grocery item. The robot may also update information in the map knowledge base 310 with the location of the grocery item.

By analyzing past experiences from many different robots, the cloud computing system 304 may be configured to synthesize certain rules for robots to follow when executing the "Groceries" application. For example, some rules that could be synthesized or generalized from a large number of robot experiences might include (i) unidentifiable frozen items should be stored in a freezer, (ii) identifiable cold items should be stored in a refrigerator, (iii) certain types of vegetables should be stored in a certain refrigerator drawer, (iv) items should not be placed on top of bread in a pantry, etc. In this manner, robot experiences (including "coaching" from humans) can be used to improve the way that robots execute the "Groceries" application.

Another example application may be called "Fetch." The "Fetch" application may include robot instructions for playing fetch with a dog. The "Fetch" application may be created by a human with limited or novice-level robot programming skills. To create the "Fetch" application, the person could instruct the robot to record a series of tasks (similar to a macro) including (i) grasping a ball from the ground, (ii) throwing the ball, (iii) waiting for a dog to return with the ball, (iv) praising the dog, and (v) repeating tasks (i)-(iv). When the robot executes the "Fetch" application, the person may adjust or further configure certain aspects of the individual tasks via a robot user interface on a smartphone, tablet computer, etc. to "fine tune" the application. For example, the person may increase or decrease the force with which the robot throws the ball or vary the praise given to the dog upon returning with the ball, e.g., "Good dog!" Creating the "Fetch" application in this manner is akin to "teaching" the robot a new skill.

After creating the "Fetch" application, the person may upload the application (or perhaps instruct the robot to upload the application) to the application knowledge base 311. Once uploaded to the application knowledge base 311, other robots can download and/or execute the "Fetch" application. Thus, the skill (i.e., playing fetch with a dog) learned by a single robot can be shared with all other robots via the application knowledge base 311 so that each robot does not have to learn the skill on its own.

Also, as described above, some applications in the application knowledge base 311 may build upon data from other knowledge bases. For example, the "Fetch" application may rely on a "grasp" task from the task knowledge base 309 and a "ball" object from the general object knowledge base 308. As individual robots become better at applying the "grasp" task to the "ball" object through either trial and error and/or human "coaching," the individual robots can update data in the shared robot knowledge base 306 based on their individual experiences. As a result, the cloud computing system 304 can optimize the "Fetch" application based on the collective experiences of many different robots. Thus, each time a robot connects to the cloud computing system 304 to execute the "Fetch" application from the application knowledge base 311, that robot gains the benefit of the collective experiences of many other robots that have executed the "Fetch" application in the past.

Another example of a robot leveraging the information contained in the shared robot knowledge base 306 is a "Make Dinner" application. In operation, a robot executing the "Make Dinner" application might first determine the inventory of food items (e.g., flour, milk, eggs, rice, soda, cookies, spinach, ground beef, cheese, tomatoes, potatoes, etc.) available in a person's house by either or both (i) identifying items in the person's refrigerator and pantries and/or (ii) querying the map knowledge base 310 to determine the inventory of available food. The robot may also determine the inventory of available food preparation tools (i.e., pots, pans, oven, kitchen tools, utensils, etc.) available in the person's house by either or both (i) identifying the available food preparation tools in the person's kitchen and/or (ii) querying the map knowledge base 310 to determine the inventory of available food preparation tools.

Once the inventory of available food items and food preparation tools are known, the inventory can be compared to requirements for various food preparation applications in the application knowledge base 311, e.g., "Make Lasagna," "Make Pot Roast," "Make Spinach Salad," "Make Baked Potatoes," etc. This type of comparison is an example of one application in the application knowledge base 311, i.e., "Make Dinner," leveraging other applications in the application knowledge base 311.

After comparing the food item and food preparation tool inventories from the map knowledge base 310 with food preparation application requirements from the application knowledge base 311, the robot may suggest to the person that the robot prepare a particular meal. The suggested meal would be a meal for which the person has all of the required food items and food preparation tools based on the inventory of food items and food preparation tools from the map knowledge base 310. In some instances, the robot might suggest to the human that it could prepare a particular meal, e.g., spaghetti, if one or more additional items were available, e.g., noodles. The robot could also access map data about local grocery stores from the map knowledge base 310 to identify the closest grocery store that has noodles in stock.

Robot Interaction with a Shared Robot Knowledge Base

Figure 4:
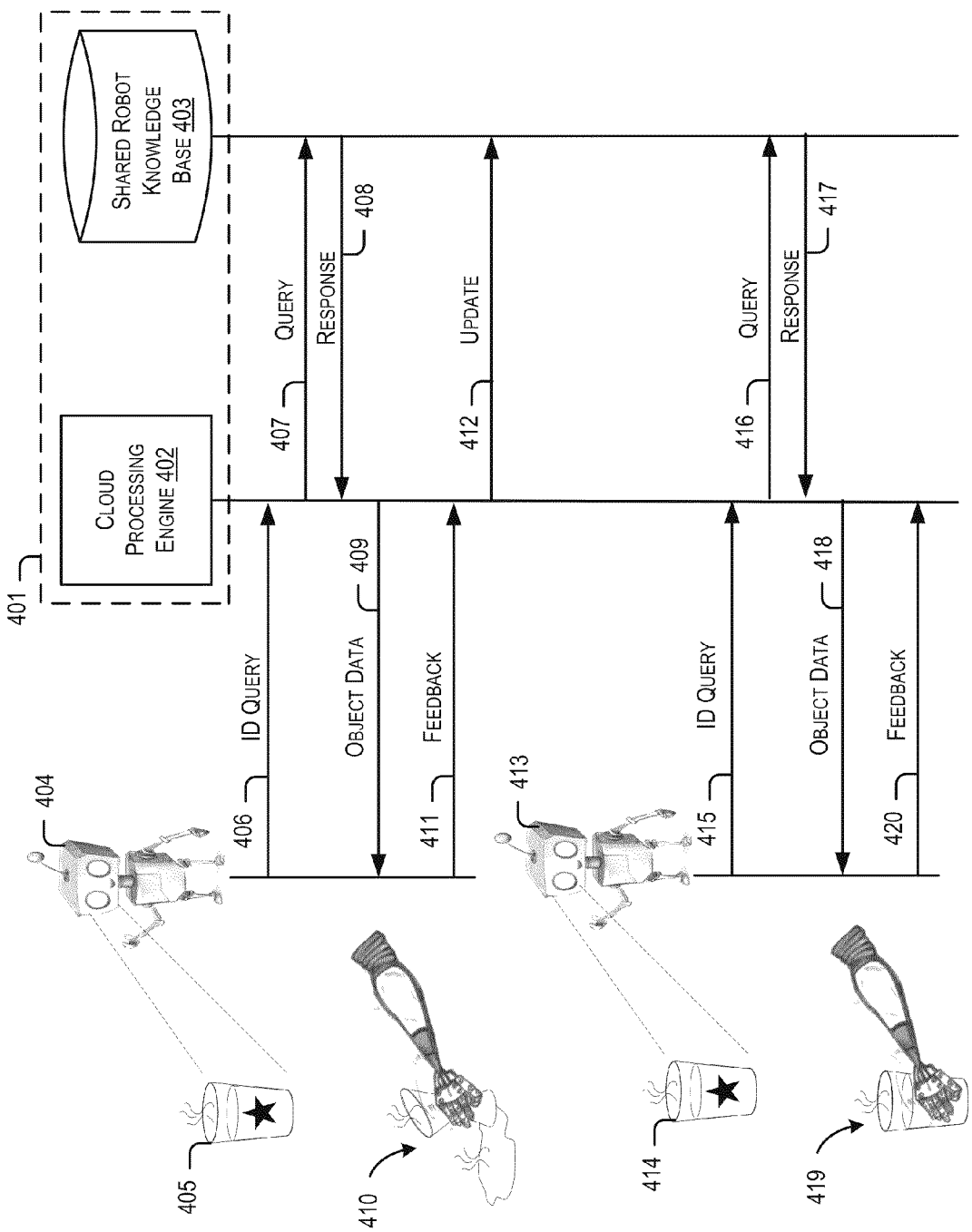
FIG. 4 shows a message flow diagram between multiple robots and a cloud computing system having a shared robot knowledge base according to some embodiments of the disclosed systems and methods.

FIG. 4 shows a message flow diagram between multiple robots 404, 413 and a cloud computing system 401 having a shared robot knowledge base 403 according to some embodiments of the disclosed systems and methods.

The example cloud computing system 401 shown in FIG. 4 includes a cloud processing engine 402 and a shared robot knowledge base 403. The robots 404, 413, the cloud computing system 401, the cloud processing engine 402, and the shared robot knowledge base 403 may similar to the robots, cloud computing systems, cloud processing engines, and shared robot knowledge bases described herein with respect to FIGS. 1-3. The horizontal lines between the robots 404, 413, the cloud processing engine 402, and the shared robot knowledge base 403 illustrate message flows between the different entities.

In operation, the robot 404 obtains identification information associated with an object 405 via one or more sensors associated with the robot 404. For example, in FIG. 4, the robot 404 obtains image data (e.g., an image, a 3D image, a point cloud, etc.) associated with the object 405 via optical sensors. However, the robot 404 may use other types of sensors to obtain other types of identification information associated with the object 405, e.g., information from an RFID tag affixed to or associated with the object 404, etc. as described elsewhere herein.

After obtaining image data associated with the object 405, the robot 404 sends an identification query 406 to the cloud processing engine 402. The identification query 406 may include at least some of the image data associated with the object 405. After receiving image data associated with the object 405 from the robot 404, the cloud processing engine 402 may analyze the image data. The analysis may include extracting meaningful information from the image via digital image processing techniques. For example, the cloud processing engine 402 may extract certain features from the image data, e.g., the outline, texture, and/or color of the object 405. The cloud processing engine 402 may also extract text, bar codes, QR codes, and/or product logos from the image of the object 405 for analysis. For example, the cloud processing engine 402 may extract the star-shaped product logo appearing on the object 405. The cloud processing engine 402 may use the results of the image analysis to send a query 407 the shared robot knowledge base 403. In some embodiments, the cloud processing engine 401 may query an object knowledge base component of the shared robot knowledge base 403 similar to the general object knowledge base 308 or the unique object knowledge base 307 shown and described herein with respect to FIG. 3.

The cloud processing engine 402 may receive a response 408 from the shared object knowledge base 403 in response the query 407. In some embodiments, the response 408 may include a list of items that appear to match the object 405, and the cloud processing engine 402 may select the most-likely match. In other embodiments, the response 408 from the shared robot knowledge base 403 may simply include the most-likely match.

In the example shown in FIG. 4, cloud computing system 401 may conclude that the object 405 is a cup of coffee. The conclusion that the object 405 is a cup of coffee may be based on the size and shape of the cup, color of the liquid in the cup, and the star-shaped product logo on the cup. If the robot 404 is equipped with a thermal imaging sensor, it could also determine the temperature of the liquid within the cup, or at least determine whether the liquid is hot or cold.

In addition to the identity of the object 405, the response 408 may also include additional information associated with the cup of coffee that may be stored in the shared robot knowledge base 403. For example, the response 408 may include specifications of the cup of coffee, such as, (i) the dimensions (height, circumference) of the cup, (ii) the weight of the cup when empty, (iii) the weight of cup when filled with liquid, (iv) the material that the cup is made from (e.g., paper, plastic, Styrofoam, ceramic, etc.), or any other similar object data similar to the object data shown and described herein with respect to the general object knowledge base 308 of FIG. 3. The response 408 may also include task information associated with the cup, such as, (i) how to grasp the cup, (ii) how to pick up the cup, (iii) how to carry the cup, or any other task data similar to the task data shown and described herein with respect to the task knowledge base 309 of FIG. 3.

The response 408 need not return all the information stored about the cup in the shared robot knowledge base 403. Instead, the response 408 may contain just the information about the cup that the cloud processing engine 402 requested from the shared robot knowledge base 403. The cloud processing engine 402 may determine which information to request from the shared robot knowledge base 403 based on a particular application or task that that the robot may be performing at the time.

After determining that the object is a cup 405 and obtaining information about the cup 405, the cloud computing system 401 can send object data 409 associated with the cup 405 to the robot 404 in response to the identification query 406 received from the robot 404. The object data 409 may include both the identity of the cup 405 and instructions for interacting with the cup 405 based on the application or task that the robot 404 has been instructed to execute or perform.

In the example shown in FIG. 4, the robot 404 may be performing an application that includes moving the cup 405 from one location to another location. To move the cup 405, the robot 404 must first grasp the cup 405 with its robot hand. The instructions for grasping the cup 405 may include instructions for positioning the robot hand around the cup 405, the amount of force to use when grasping the cup 405, and how tightly to close the fingers of the robot hand around the cup 405.

After receiving the instructions in the object data 409 from the cloud computing system 401, the robot 404 can execute the instructions to grasp the cup 405. However, in this example, when the robot 404 grasps the cup 405 according to the instructions it received in the object data 409 from the cloud computing system 401, the robot 404 crushes the cup 405 and causes the coffee to spill 410. In this example interaction, the grasping force specified in the instructions was too high, and as a result, the robot crushed the cup and caused a mess. When an accident happens, a human can "coach" the robot on how much force to use by, for example, manually controlling the robot's hand to grasp a new cup. The robot can capture the grasping force that it used to successfully grasp the cup under the manual control of the human, and then send feedback 411 to the cloud processing system 402 with the modified grasping force. The cloud processing system 402 can then update 412 task and object data in the shared robot knowledge base 403 to improve how the "grasp" task is applied this particular "cup" object.

Later, a second robot 413 may encounter an object 414 while performing the same (or a similar) application that requires grasping the same type of cup. The second robot 413 may send image data associated with the object 414 in an identification query 415 to the cloud computing system 401. The cloud processing engine 402 may analyze the image data in the identification query 415 from the robot 413, send a query 416 to the share robot knowledge base 403, and receive a response 417 from the shared robot knowledge base 403.

After determining the object is a cup 414 and obtaining information about the cup 414, the cloud computing system 401 can send object data 418 associated with the cup 414 to the robot 413 in response to the identification query 415 received from the robot 413. The object data 418 may include both the identity of the cup 414 and instructions for interacting with the cup 414 based on the application or task that the robot 413 has been instructed to execute or perform.

The robot 413 may be performing a task that requires the robot 413 to grasp the cup 414. The instructions for interacting with the cup 414 may include instructions for positioning the robot hand around the cup 414, the amount of force to use when grasping the cup 414, and how tightly to close the fingers of the robot hand around the cup 414. Importantly, the cloud computing system 401 updated the amount of force to use when grasping the particular type of cup that the robot 413 must now grasp (i.e., cup 414) based on the feedback 411 previously received from robot 404 regarding the same type of cup. As a result, when the robot 413 applies the "grasp" task to the type of "cup" object here (i.e., when robot 413 grasps cup 414), the robot 413 successfully grasps the cup without crushing the cup 419. Thus, the second robot 413 has in effect learned from the experience of the earlier robot 404.

After successfully grasping the cup 419, the robot 413 may send feedback 420 to the cloud processing engine 402 that confirms the accuracy of the instructions that the robot 413 received in the object data 418 from the cloud computing system 401.

Figure 5:
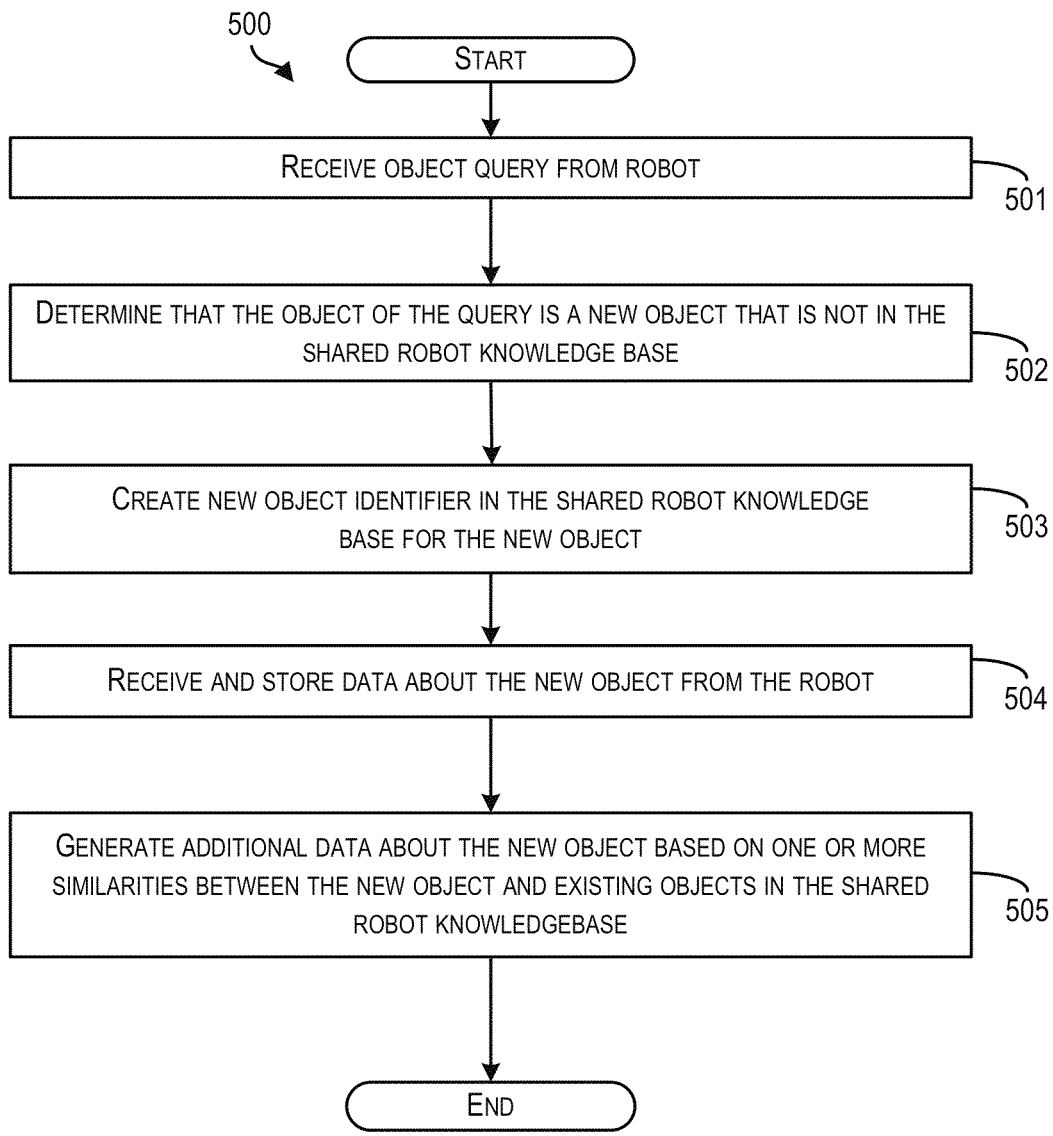
FIG. 5 shows an example method of using a shared robot knowledge base according to some embodiments of the disclosed systems and methods.

FIG. 5 shows an example method 500 of using a shared robot knowledge base according to some embodiments of the disclosed systems and methods. The shared robot knowledge base may be similar to any of the shared robot knowledge bases shown and described herein with respect to FIGS. 1-4.

The method begins at block 501 when a cloud computing system receives an object query from a robot. The query received from the robot may similar to the other robot-generated queries described elsewhere herein.

At block 502, the cloud computing system may determine that the object in the query from the robot is a "new" object that cannot be found in the shared robot knowledge base. At block 503, the cloud computing system may create a new object identifier in the shared robot knowledge base for the new object. For example, the cloud computing system may create a new general object identifier (GID) for the new object in an object knowledge base component of the robot knowledge base, such as the general object knowledge base 308 shown and described herein with respect to FIG. 3.

After creating a new object identifier for the new object in the shared robot knowledge base, the cloud computing system may instruct the robot to collect additional information about the new object, such as the weight, dimensions, or other type of information. The robot may collect the requested information about the new object, and then send the requested information to the cloud computing system. At block 504, the cloud computing system may store the received information about the new object in the shared robot knowledge base. For example, the cloud computing system may store the received information as specification data (SPC) associated with the new general object identifier (GID) in the general object knowledge base 308 shown and described herein with respect to FIG. 3.

In block 505, the cloud computing system may generate additional data about the new object based on the similarities between the new object and other objects already stored in the shared robot knowledge base. For example, if the new object is a new type of cup, then the cloud computing system may generate task information about the new type of cup based on information about other similar cups, such as how to grasp the new cup, how to fill the new cup with liquid, how to carry the new cup when the new cup is filled with liquid, how to set the cup on a surface, how to pour liquid from the new cup, how to crush the cup, how to dispose of the cup in a recycling bin, or other types of tasks or information about the new cup.

Later, when another robot encounters a cup that is the same type of cup as the new cup, the cloud computing system can identify the new cup in the shared robot knowledge base and provide the other robot with instructions for how to use or otherwise interact with the cup. In this manner, later robots benefit from the information about the cup that was collected and sent to the shared robot knowledge base by the earlier robot. Similarly, the cloud computing system can further leverage information collected about objects by robots and enhance and/or augment robot learning by analyzing similarities between a newly-discovered object (i.e., newly-discovered by robots at least) and known objects (i.e., objects already stored in the shared robot knowledge base) to predict how robots should interact with the newly-discovered object.

Figure 6:
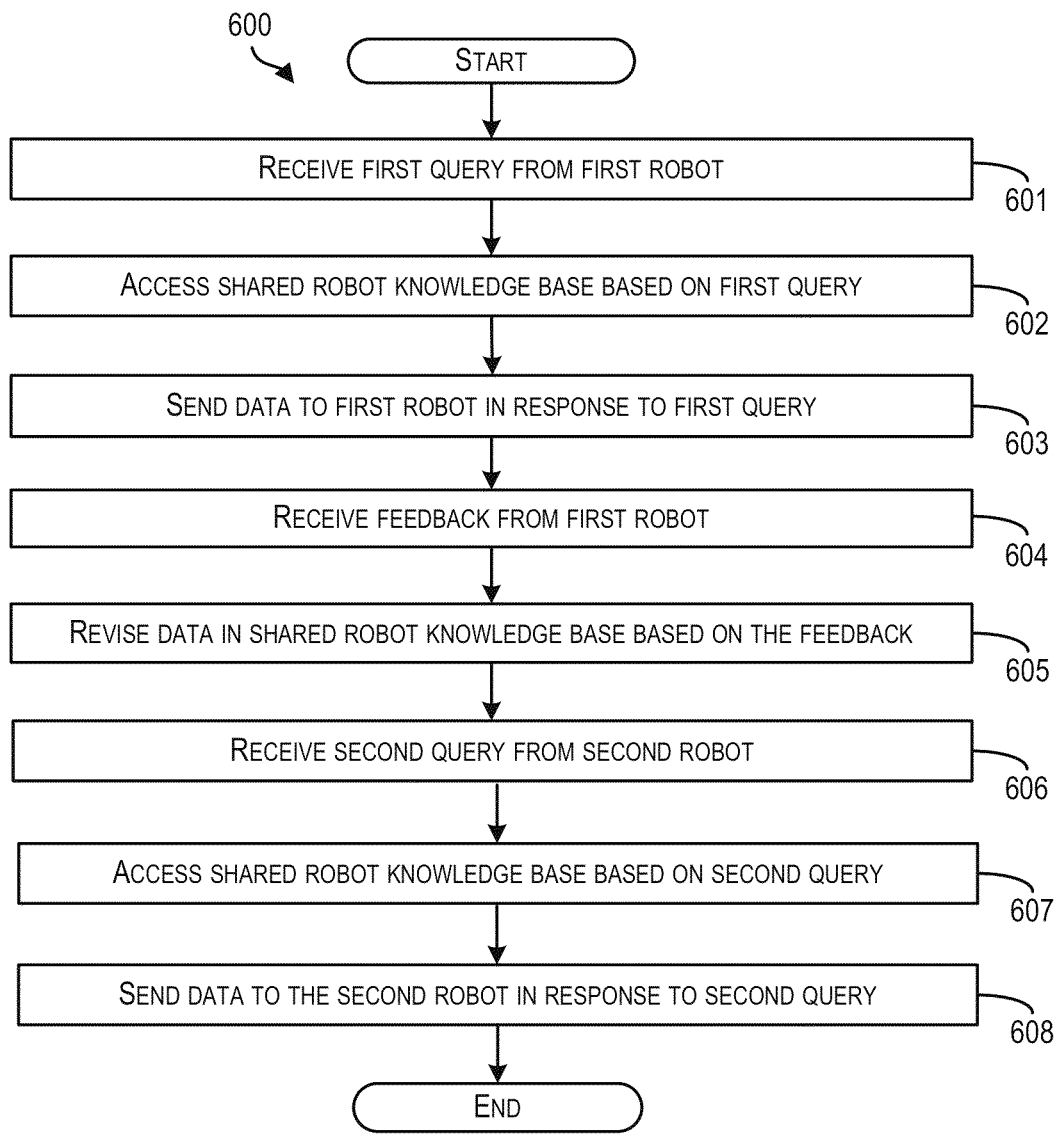
FIG. 6 shows another example of using a shared robot knowledge base according to some embodiments of the disclosed systems and methods.

FIG. 6 shows another example method 600 of using a shared robot knowledge base according to some embodiments of the disclosed systems and methods. The shared robot knowledge base may be similar to any of the shared robot knowledge bases shown and described herein with respect to FIGS. 1-4.

The method 600 begins at block 601 where a cloud computing system receives a first query from a first robot. The first robot may be similar to any of the robots shown and described herein with respect to FIGS. 1-4. The first query may include identification information associated with an object. The identification information may include any type of object identification described herein, e.g., image data, textual data, sound data, etc.

At block 602, the cloud computing system accesses the shared robot knowledge base based on the information contained in the first query. The shared robot knowledge base may be accessed for the purpose of (i) recognizing and/or identifying the object of the first query, (ii) obtaining information about the object of the first query, and/or (iii) obtaining instructions for interacting with the object of the first query.

At block 603, the cloud computing system sends data associated with the object of the first query to the first robot in response to the first query received from the first robot at block 601. The data sent to the first robot at block 603 may include (i) a name or identity of the object of the first query (if the name or identity was not already a component of the first query at block 501), (ii) one or more attributes of the object of the first query, and/or (iii) instructions for interacting with the object of the first query. The data associated with the object of the first query that is sent to the first robot in block 603 may be any of the types of object-related data (or other types of data) that may be stored in the shared robot knowledge base as described herein. For example, the data may include any of the data or types of data about objects (specifications, manufacturer, etc.) or otherwise associated with objects (task data, map data, etc.) shown and described herein with respect to FIGS. 1-4.

At block 604, the cloud computing system receives feedback from the first robot. The feedback may be based on the result of a comparison between (i) an attribute of the object sent to the first robot at block 503 and (ii) the first robot's separate determination (independently or via human coaching) of the attribute. For example, if the data sent to the first robot at block 603 specified the weight of the object of the first query as being 1 pound, but the first robot independently determined that the weight of the object of the first query was 2 pounds, then the feedback received at block 604 may be an indication of the determined discrepancy. The feedback may additionally or alternatively include a revision to instructions for interacting with the object of the first query based on the robot's experience with following the instructions sent at block 603. For example, if the object of the first query was a door, and the instructions for interacting with the door specified rotating the doorknob 90 degrees to open the door, but the robot needed to rotate the doorknob 130 degrees to open the door, then the feedback received at block 504 may be an indication of the determined discrepancy. In some embodiments, the feedback may be based on coaching received by the robot from a human, such as the coaching described elsewhere herein, such as the coaching shown and described herein with respect to FIG. 4. At block 605, the cloud computing system may revise the data in the shared robot knowledge base based on the feedback received at block 604.

At block 606, the cloud computing system receives a second query from a second robot. The second query may contain identification information associated with an object that the second robot needs to interact with. In this example, the object that the second robot needs to interact with may be the same type of object as the object of the first query described above. The type of information in the second query may be similar to the type of information in the first query received at block 601 even if the contents of the second query are not identical to the contents of the first query.

At block 607, the cloud computing system accesses the shared robot knowledge base for the purpose of (i) recognizing and/or identifying the object of the second query, (ii) obtaining information about the object of the second query, and/or (iii) obtaining instructions for interacting with the object of the second query.

At block 608, the cloud computing system sends data associated with the object of the second query to the second robot in response to the second query received from the second robot at block 606. The data may include (i) a name or identity of the object of the second query (if the name or identity was not already a component of the second query at block 606), (ii) one or more attributes of the object of the second query, and/or (iii) instructions for interacting with the object of the second query.

If the object of the second query is the same object (or same type of object), as the object of the first query, then the data associated with the object of the second query sent to the second robot at block 608 may include the revised data from block 605 that was based on the feedback from the first robot at block 604. When the second robot receives the revised data from block 605 that was based on the feedback from the first robot at block 604, the second robot has effectively learned from the previous experience of the first robot even though the first robot and the second robot may not have ever directly communicated with one another.

While various aspects and embodiments have been disclosed herein, other aspects and embodiments will be apparent to those skilled in the art. The various aspects and embodiments disclosed herein are for purposes of illustration only and are not intended to be limiting, with the true scope and spirit being indicated by the following claims.

What is claimed is:

1. A method comprising:
   receiving a first query from a first robot, wherein the first query includes identification information associated with an object, and wherein the first robot has a computing ability and is configured to interact with its surroundings via one or more sensors or electromechanical devices associated with the first robot;
   identifying data in a shared robot knowledge base based at least in part on the first query, wherein the identified data corresponds to the object of the first query and comprises robot executable instructions for interacting with the object that include instructions for controlling the object using commands sent over a communications link between the first robot and the object, wherein the instructions for interacting with the object include instructions for physically controlling the object using at least one of the electromechanical devices associated with the first robot, wherein the shared robot knowledge base comprises data related to an inventory of objects, and wherein the data stored in the shared robot knowledge base is accessible by at least the first robot;
   sending the identified data to the first robot, wherein the identified data is usable by the first robot to interact with the object;
   receiving feedback from the first robot based on the first robot's interaction with the object, wherein the feedback is usable to at least one of (i) revise the identified data and (ii) create new data corresponding to the object of the first query; and
   updating the shared robot knowledge base based at least in part on the feedback received from the first robot.

2. The method of claim 1, wherein the identification information associated with the object includes at least one of (i) language data corresponding to the object, (ii) image data corresponding to the object, and (iii) data read from a tag or beacon corresponding to the object.

3. The method of claim 1, wherein the feedback received from the first robot is based on coaching received by the first robot from a human.

4. The method of claim 1, wherein the identified data corresponding to the object of the first query further comprises a physical attribute of the object, wherein the physical attribute includes at least one of (i) a dimension, (ii) weight, (iii) mass, (iv) color, (v) texture, and (vi) material composition.

5. The method of claim 4, wherein the feedback is based on a comparison between (i) the value of at least one physical attribute of the object specified in the identified data and (ii) the first robot's determination of the value of the at least one physical attribute of the object.

6. The method of claim 1, wherein the feedback includes at least one revision to the robot executable instructions for interacting with the object.

7. The method of claim 1, wherein the robot executable instructions for interacting with the object include instructions for controlling the one or more sensors or electromechanical devices associated with the first robot.

8. The method of claim 4, wherein at least one of the physical attributes of the object and the robot executable instructions for interacting with the object is received from a manufacturer of the object and stored in the shared robot knowledge base.

9. The method of claim 1, further comprising:
   receiving a second query from a second robot, wherein the second query includes identification information associated with an object that is of the same type as the object of the first query, wherein the second robot has a computing ability and is configured to interact with its surroundings via one or more sensors or electromechanical devices associated with the second robot; and
   sending data associated with the object of the second query to the second robot in response to the second query received from the second robot, wherein the data associated with the object of the second query is based at least in part on the feedback received from the first robot based on the first robot's interaction with the object of the first query.

10. A system comprising:
a shared robot knowledge base that stores an inventory of objects, wherein the data stored in the shared robot knowledge base is accessible by a plurality of robots, wherein individual robots have a computing ability and are configured to interact with their surroundings via one or more associated sensors or electromechanical devices;
a cloud processing engine that (i) receives a first query from a first robot, wherein the first query includes identification information associated with an object detected by the robot, and (ii) identifies data in the shared robot knowledge base based at least in part on the first query, wherein the identified data corresponds to the object of the first query and comprises robot executable instructions for interacting with the object that include instructions for controlling the object using commands sent over a communications link between the first robot and the object and wherein the instructions for interacting with the object include instructions for physically controlling the object using at least one or the electromechanical devices associated with the first robot;
a communications interface that (i) sends the identified data to the first robot, wherein the identified data is usable by the first robot to interact with the object, and (ii) receives feedback from the first robot based on the first robot's interaction with the object; and
wherein the cloud processing engine is configured to update the shared robot knowledge base by at least one of (i) revising the identified data based at least in part on the feedback from the first robot and (ii) creating new data corresponding to the object of the first query based at least in part on the feedback from the first robot.

11. The system of claim 10, wherein the feedback received from the first robot is based on at least one of:
(i) coaching received by the first robot from a human;
(ii) a comparison between (a) the value of at least one physical attribute of the object specified in the identified data and (b) the first robot's determination of the value of the at least one physical attribute of the object.

12. The system of claim 10, wherein the identified data corresponding to the object of the first query further comprises a physical attribute of the object.

13. The system of claim 10, wherein the robot executable instructions for interacting with the object include instructions for controlling the one or more sensors or electromechanical devices associated with the first robot.

14. The system of claim 10, wherein the cloud processing engine is further configured to (i) receive a second query from a second robot, wherein the second query includes identification information associated with an object that is of the same type as the object of the first query, and (ii) send data associated with the object of the second query to the second robot in response to the second query, wherein the data associated with the object of the second query is based at least in part on the feedback received from the first robot.

15. An article of manufacture comprising tangible non-transitory computer readable media having instructions stored thereon, the instructions comprising:
instructions for processing a first query received from a first robot, wherein the first query includes identification information associated with an object, and wherein the first robot has a computing ability and is configured to interact with its surroundings via one or more associated sensors or electromechanical devices;
instructions for identifying data in a shared robot knowledge base based at least in part on the first query, wherein the identified data corresponds to the object of the first query and comprises robot executable instructions for interacting with the object that include instructions for controlling the object via commands sent over a communications link between the first robot and the object, wherein the instructions for interacting with the object include instructions for physically controlling the object using at least one of the electromechanical devices associated with the first robot, wherein the shared robot knowledge base comprises data related to an inventory of objects, and wherein the data stored in the shared robot knowledge base is accessible by at least the first robot;
instructions for initiating the transmission of the identified data to the first robot, wherein the identified data is usable by the first robot to interact with the object;
instructions for processing feedback received from the first robot based on the first robot's interaction with the object, wherein the feedback is usable for at least one of revising the identified data or creating new data corresponding to the object of the first query; and
instructions for updating the shared robot knowledge base based at least in part on the feedback received from the first robot.

16. The article of manufacture of claim 15, wherein the identified data corresponding to the object of the first query further comprises a physical attribute of the object.

17. The article of manufacture of claim 15, wherein the robot executable instructions for interacting with the object include instructions for controlling the one or more sensors or electromechanical devices associated with the first robot.

18. The article of manufacture of claim 15, wherein the feedback received from the first robot is based on at least one of:
(i) coaching received by the first robot from a human;
(ii) a comparison between (a) the value of at least one physical attribute of the object specified in the identified data and (b) the first robot's determination of the value of the at least one physical attribute of the object.

19. The article of manufacture of claim 15, further comprising:
instructions for processing a second query received from a second robot, wherein the second query includes identification information associated with an object that is of the same type as the object of the first query, wherein the second robot has a computing ability and is configured to interact with its surroundings via one or more associated sensors or electromechanical devices; and
instructions for initiating the transmission of data associated with the object of the second query to the second robot in response to the second query received from the second robot, wherein the data associated with the object of the second query is based at least in part on the feedback received from the first robot based on the first robot's interaction with the object of the first query.

20. A method comprising:
receiving a first query from a first robot, wherein the first query includes identification information associated with an object detected by one or more sensors associated with the first robot;

determining whether the identification information received in the first query corresponds to an object having an object identifier stored in a shared robot knowledge base;

creating a new object identifier in the shared robot knowledge base in response to determining that the identification information received in the first query does not correspond to an object having an object identifier stored in the shared robot knowledge base;

instructing the first robot to collect information about the object;

receiving information about the object from the first robot in response to the instructions to collect information about the object, wherein the information about the object includes (i) image data and (ii) location data;

storing data about the object in the shared robot knowledge base, wherein the stored data is based at least in part on the information received from the first robot; and generating instructions for interacting with the object based on instructions for interacting with at least one other object stored in the shared robot knowledge base, wherein the instructions for interacting with the at least one other object include instructions for controlling the object using commands sent over a communication link between the first robot and the object, and wherein the instructions for interacting with the object include instructions for physically controlling the object using at least one electromechanical device associated with the first robot.

21. The method of claim 20, wherein the identification information associated with the object includes (i) language data associated with the object, (ii) image data associated with the object, and (iii) data read from a tag or beacon associated with the object.

22. The method of claim 20, wherein determining whether the identification information received in the first query corresponds to an object having an object identifier stored in the shared robot knowledge base comprises at least one of:

comparing language data in the first query with language data associated with a plurality of object identifiers stored in the shared robot knowledge base;

comparing image data in the first query with image data associated with the plurality of object identifiers stored in the shared robot knowledge base; and comparing data read from a tag or beacon in the first query with identification data associated with the plurality of object identifiers stored in the shared robot knowledge base.

23. The method of claim 20, further comprising:

storing the generated instructions in the shared robot knowledge base; and associating the generated instructions with the new object identifier.

24. The method of claim 20, further comprising:

receiving a second query from a second robot, wherein the second query includes identification information associated with an object detected by one or more sensors associated with the second robot; and sending data associated with the new object identifier in response to determining that the identification information received in the second query corresponds to the new object identifier, wherein the data associated with the new object identifier comprises at least one of (i) a physical attribute of the object associated with the new object identifier and (ii) robot executable instructions for interacting with the object associated with the new object identifier.

* * * * *